(12) United States Patent
Qu et al.

(10) Patent No.: US 11,275,389 B2
(45) Date of Patent: Mar. 15, 2022

(54) SYSTEMS AND METHODS FOR OPERATING UNMANNED AERIAL VEHICLES

(71) Applicant: SZ DJI TECHNOLOGY CO., LTD., Shenzhen (CN)

(72) Inventors: Zongyao Qu, Shenzhen (CN); Tao Wu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 166 days.

(21) Appl. No.: 16/271,530

(22) Filed: Feb. 8, 2019

(65) Prior Publication Data

US 2019/0179344 A1 Jun. 13, 2019

Related U.S. Application Data

(63) Continuation of application No. PCT/CN2016/095708, filed on Aug. 17, 2016.

(51) Int. Cl.
*G05D 1/08* (2006.01)
*B64C 39/02* (2006.01)
(Continued)

(52) U.S. Cl.
CPC ............ *G05D 1/085* (2013.01); *B64C 17/02* (2013.01); *B64C 27/02* (2013.01); *B64C 39/024* (2013.01);
(Continued)

(58) Field of Classification Search
CPC .... G05D 1/085; G05D 1/0094; G05D 1/0011; B64C 27/02; B64C 17/02;
(Continued)

(56) References Cited

U.S. PATENT DOCUMENTS 5,374,879 A 12/1994 Pin
10,207,794 B1 * 2/2019 Beckman ................ B64C 17/00
(Continued)

FOREIGN PATENT DOCUMENTS

CN 102360217 A 2/2012
CN 102592007 A 7/2012
(Continued)

OTHER PUBLICATIONS

The World Intellectual Property Organization (WIPO) The International Search Report and Written Opinion for PCT/CN2016/095708 dated May 22, 2017 10 pages.
(Continued)

*Primary Examiner* — Hunter B Lonsberry
*Assistant Examiner* — Jimin You
(74) *Attorney, Agent, or Firm* — Anova Law Group, PLLC

(57) ABSTRACT

A method of controlling an unmanned aerial vehicle includes receiving a first signal including information relating to a payload of the unmanned aerial vehicle, retrieving a predetermined value from a memory of the unmanned aerial vehicle based on the information of the first signal, and generating a second signal for changing a configuration of an arm of the unmanned aerial vehicle to change a distance of at least one of a plurality of propulsion units of the unmanned aerial vehicle corresponding to the arm from a reference point on a central body of the unmanned aerial vehicle based on the predetermined value.

18 Claims, 10 Drawing Sheets

(51) Int. Cl.
*B64C 27/02* (2006.01)
*G01M 1/12* (2006.01)
*B64C 17/02* (2006.01)
*G05D 1/00* (2006.01)

(52) U.S. Cl.
CPC ............ *G01M 1/12* (2013.01); *G05D 1/0094* (2013.01); *B64C 2201/027* (2013.01); *B64C 2201/14* (2013.01); *B64C 2201/141* (2013.01); *B64C 2201/146* (2013.01); *G05D 1/0011* (2013.01)

(58) Field of Classification Search
CPC ............ B64C 2201/141; B64C 39/024; B64C 2201/14; B64C 2201/02; B64C 2201/146; G01M 1/12
See application file for complete search history.

(56) References Cited

U.S. PATENT DOCUMENTS

| | | | | |
|---|---|---|---|---|
| 10,407,162 | B2* | 9/2019 | Datta | B64C 27/08 |
| 10,647,404 | B2* | 5/2020 | Sugaki | B64C 27/30 |
| 2014/0313332 | A1 | 10/2014 | Sabe et al. | |
| 2016/0093124 | A1 | 3/2016 | Shi et al. | |

FOREIGN PATENT DOCUMENTS

| | | |
|---|---|---|
| CN | 203306225 U | 11/2013 |
| CN | 203318676 U | 12/2013 |
| CN | 103935513 A | 7/2014 |
| CN | 103979106 A | 8/2014 |
| CN | 104111659 A | 10/2014 |
| CN | 104828245 A | 8/2015 |
| CN | 104853988 A | 8/2015 |
| CN | 104859838 A | 8/2015 |
| CN | 105059536 A | 11/2015 |
| CN | 105093960 A | 11/2015 |
| CN | 105173068 A | 12/2015 |
| CN | 105659020 A | 6/2016 |
| CN | 205311892 U | 6/2016 |
| CN | 205931245 U | 2/2017 |
| EP | 2733070 A2 | 5/2014 |
| JP | 2003279439 A | 10/2003 |
| JP | 2007261414 A | 10/2007 |
| JP | 2014212479 A | 11/2014 |
| JP | 2016507414 A | 3/2016 |
| JP | 2016135660 A | 7/2016 |
| WO | 2014108026 A1 | 7/2014 |

OTHER PUBLICATIONS

Ryosuke Abe, "It's Like a Science Fiction World! Drone to transform the topic!", [online], Drone Borg, Feb. 27, 2015, [search on Jan. 17, 2017], Japan.
The World Intellectual Property Organization (WIPO) The International Search Report for PCT/CN2016/095723 dated May 31, 2017 6 pages.

* cited by examiner

SYSTEMS AND METHODS FOR OPERATING UNMANNED AERIAL VEHICLES

CROSS-REFERENCE TO RELATED APPLICATION

This application is a continuation of International Application No. PCT/CN2016/095708, filed on Aug. 17, 2016, the entire contents of which are incorporated herein by reference.

BACKGROUND

Unmanned vehicles, such as unmanned aerial vehicles (UAV), can have a wide variety of civilian, commercial and/or military applications. A UAV may be used, for example, in aerial photography, landscape analysis, environmental sensing, surveillance, reconnaissance, and/or exploration tasks. UAV flight stability may be desirable for various applications in which UAVs are used.

SUMMARY

Redistribution of and/or changes in the mass of any portion of the UAV may affect the stability of the UAV flight. For example, change in the configuration state of a payload of the UAV may cause a change in the center of gravity of the UAV. Changes in the center of gravity of the UAV may affect the stability of the UAV flight. Operation of the UAV may involve adjustment in the control of the UAV to account for the changes in the center of gravity. Reliance upon adjustment of only the angular velocity of one or more rotors of the UAV may limit the ability of the UAV to respond to changes in the center of gravity. The present disclosure provides systems and methods for improved operating a movable vehicle, including an unmanned vehicle, such as an unmanned aerial vehicle (UAV), such that the UAV demonstrates increased ability to respond to changes in the center of gravity of the UAV.

According to some aspects, a controller for controlling operation of an unmanned aerial vehicle may include an input configured for receiving a first signal indicating a change in a center of gravity of the unmanned aerial vehicle, wherein the unmanned aerial vehicle comprises a plurality of arms, at least one of the plurality of arms extending from a central body, and a plurality of propulsion units, at least one of the plurality of propulsion units being positioned on a corresponding arm at a distance from a reference point on the central body. The controller can include a processor configured to determine, in response to the change in the center of gravity, a change in a configuration of the corresponding arm of the unmanned aerial vehicle to change the distance of the at least one of the plurality of propulsion units from the reference point to counter the change in the center of gravity.

In some embodiments, the change in the configuration of the corresponding arm is configured to position the at least one of the plurality of propulsion units at a second distance further away from the reference point on the central body to counter the change in the center of gravity. some embodiments, the reference point is at a center of the central body. In some embodiments, the distance is a distance between a rotational axis of the at least one of the plurality of propulsion units and the reference point. In some embodiments, the change in the configuration of the corresponding arm comprises a change in a length of the corresponding arm. In some embodiments, the change in the configuration of the corresponding arm comprises extending the corresponding arm.

In some embodiments, the processor is configured to determine a change in an angular velocity of a rotor of the at least one of a plurality of propulsion units. In some embodiments, the rotor is distinct from a rotor of the at least one of a plurality of propulsion units.

In some embodiments, the input is further configured to receive information from at least one sensor on the unmanned aerial vehicle for determining the change in the configuration of the corresponding arm. In some embodiments, wherein the processor is configured to determine the change in the configuration of the at least one arm based on the information from the at least one sensor. In some embodiments, the information from the at least one sensor comprises at least one of a roll angle, pitch angle, yaw angle, roll angle velocity, pitch angle velocity and yaw angle velocity.

In some embodiments, each propulsion unit coupled to a corresponding one of the plurality of arms comprises a rotor, and wherein the processor is further configured to determine a corresponding angular velocity for each rotor. In some embodiments, wherein the processor is configured to set each corresponding angular velocity greater than a threshold angular velocity to a new angular velocity, wherein the new angular velocity is the threshold angular velocity. In some embodiments, the processor is configured to determine a length of the at least one arm using the new angular velocity.

In some embodiments, the first signal comprises information received from at least one of a gyroscope, inertial measurement unit, mass sensor, accelerometer and GPS sensor.

In some embodiments, the processor is further configured to determine change in configuration of more than one of the plurality of arms.

In some embodiments, the first signal indicates a change in configuration of a payload of the unmanned aerial vehicle. In some embodiments, the first signal comprises a signal indicating at least one of a change in mass of the payload and a redistribution of mass of the payload. In some embodiments, the first signal comprises a signal indicating an extension or retraction of a telescoping feature of the payload. In some embodiments, the first signal comprises a signal indicating an extension or retraction of at least one of a telescoping arm, telescoping lens unit and telescoping nozzle of the payload.

According to some aspects, a method of controlling an unmanned aerial vehicle can include receiving a first signal indicating a change in a center of gravity of the unmanned aerial vehicle, wherein the unmanned aerial vehicle comprises a plurality of arms, at least one of the plurality of arms extending from a central body, and a plurality of propulsion units, at least one of the plurality of propulsion units being positioned on a corresponding arm at a distance from a reference point on the central body; and determining, in response to the change in the center of gravity, a change in a configuration of at least one of the plurality of arms of the unmanned aerial vehicle to change the distance of the at least one of the plurality of propulsion units from the reference point to counter the change in the center of gravity.

In some embodiments, the change in the configuration of the at least one arm is configured to position the at least one of the plurality of propulsion units at a second distance further away from the reference point on the central body to counter the change in the center of gravity. In some embodiments, the reference point is at a center of the central body.

In some embodiments, determining comprises determining a change in a length of the at least one arm.

In some embodiments, the method includes determining a change in an angular velocity of a rotor of a propulsion unit coupled to the at least one arm.

In some embodiments, the method includes receiving information from at least one sensor on the unmanned aerial vehicle for determining the change in the configuration of the at least one arm. In some embodiments, determining comprises determining the change in the configuration of the at least one arm based on the information from the at least one sensor. In some embodiments, receiving the information from the at least one sensor comprises at least one of a roll angle, pitch angle, yaw angle, roll angle velocity, pitch angle velocity and yaw angle velocity.

In some embodiments, the first signal comprises information received from at least one of a gyroscope, inertial measurement unit, mass sensor, accelerometer and GPS sensor.

In some embodiments, the first signal indicates a change in configuration of a payload of the unmanned aerial vehicle. In some embodiments, the first signal comprises a signal indicating at least one of a change in mass of the payload and a redistribution of mass of the payload. In some embodiments, the first signal comprises a signal indicating an extension or retraction of a telescoping feature of the payload. In some embodiments, the first signal comprises a signal indicating an extension or retraction of at least one of a telescoping arm, telescoping lens unit and telescoping nozzle of the payload.

According to some aspects, a controller for controlling an unmanned aerial vehicle, can include an input for receiving a first signal comprising information relating to a payload of the unmanned aerial vehicle, wherein the unmanned aerial vehicle comprises a plurality of arms, at least one of the plurality of arms extending from a central body, and a plurality of propulsion units, at least one of the plurality of propulsion units being positioned on a corresponding arm at a distance from a reference point on the central body; and a memory for storing predetermined values; and a processor configured to retrieve a predetermined value from the memory based on the first signal for determining a change in the distance of the at least one of the plurality of propulsion units from the reference point.

In some embodiments, the input is further configured to receive information indicating an absence of the payload. In some embodiments, the input is further configured to receive information indicating a payload type. In some embodiments, the input is further configured to receive information of a configuration state of the payload.

In some embodiments, the memory comprises a table, and the process is configured to retrieve the predetermined value from the table of the memory. In some embodiments, in the predetermined value indicates the distance of the at least one of the plurality of propulsion units from the reference point. In some embodiments, the predetermined value indicates a length of the corresponding arm to which the at least one of the plurality of propulsion units is coupled.

In some embodiments, the processor is further configured to perform a calculation using the predetermined value and generate a second signal for changing a configuration of the corresponding arm based on a result of the calculation.

In some embodiments, the input is configured to receive the first signal from at least one sensor on the unmanned aerial vehicle. In some embodiments, the input is configured to receive the first signal from a user input.

According to some aspects, a method of controlling an unmanned aerial vehicle can include receiving a first signal comprising information relating a payload of the unmanned aerial vehicle, wherein the unmanned aerial vehicle comprises a plurality of arms, at least one of the plurality of arms extending from a central body, and a plurality of propulsion units, at least one of the plurality of propulsion units being positioned on a corresponding arm at a distance from a reference point on the central body. The method can include retrieving a predetermined value from a memory of the unmanned aerial vehicle based on the information of the first signal; and generating a second signal for changing the configuration of the corresponding arm to change the distance of the at least one of the plurality of propulsion units from the reference point based on the predetermined value.

In some embodiments, receiving the first signal comprises receiving information indicating an absence of the payload. In some embodiments, receiving the first signal comprises receiving information indicating a payload type. In some embodiments, receiving the first signal comprises receiving information of a configuration state of the payload.

In some embodiments, retrieving the predetermined value comprises retrieving a value indicating a length of the corresponding arm. In some embodiments, receiving the first signal comprises receiving the first signal from at least one sensor on the unmanned aerial vehicle In some embodiments, receiving the first signal comprises receiving the first signal from a user input.

In some embodiments, the method can include performing a calculation using the predetermined value and generating the second signal for changing the configuration of at the corresponding arm comprises generating a signal based on a result of the calculation.

In some embodiments, generating the second signal for changing the configuration of at least one arm of the plurality of arms comprises generating a signal comprising an instruction to change a length of the at least one arm.

According to some aspects, a unmanned aerial vehicle can include a central body; a plurality of arms, at least one of the plurality of arms extending outwardly from the central body; and a plurality of propulsion units, the plurality of propulsion units being coupled to corresponding arms, and a distance of at least one of the plurality of propulsion units from a reference point on the central body being adjustable by manipulating a configuration of at least one of the corresponding arms in response to a change in a center of gravity of the unmanned aerial vehicle.

In some embodiments, the configuration of at least one corresponding arms comprises a length of the at least one corresponding arms. In some embodiments, the at least one corresponding arms is extendable.

In some embodiments, wherein each of the propulsion units comprises a rotor, and the distance of the at least one of the plurality of propulsion units from the reference point is a distance from a rotational axis of the rotor to the reference point.

In some embodiments, the unmanned aerial vehicle can include a plurality of rotors and a plurality of sets of rotor blades, wherein each of the propulsion units comprises a corresponding rotor, and each of sets of rotor blades is coupled to a corresponding rotor, and wherein an angular velocity of at least one set of rotor blades is adjustable in response to the change in the center of gravity of the unmanned aerial vehicle.

In some embodiments, the unmanned aerial vehicle can include a payload, wherein the change in the center of gravity of the unmanned aerial vehicle comprises a change in a configuration of the payload. In some embodiments, the payload comprises a telescoping feature.

According to some aspects, an unmanned aerial vehicle (UAV), can include a central body; a plurality of arms, at least one of the plurality of arms extending outwardly from the central body; and a plurality of propulsion units, each of the plurality of propulsion units being coupled to a corresponding arm, and a configuration of at least one of the corresponding arms being adjustable in response to a change in a center of gravity of the UAV.

According to some aspects, a method of operating an unmanned aerial vehicle can include receiving a first signal indicating a change in a center of gravity of the unmanned aerial vehicle, wherein the unmanned aerial vehicle comprises a central body, a plurality of arms, at least one of the plurality of arms extending outwardly from the central body, and a plurality of propulsion units, the plurality of propulsion units being coupled to corresponding arms. The method can include adjusting a distance of at least one of the plurality of propulsion units from the central body by manipulating a configuration of at least one of the corresponding arms in response to the change in a center of gravity of the unmanned aerial vehicle.

In some embodiments, manipulating the configuration of at least one corresponding arms comprises adjusting a length of the at least one corresponding arms. In some embodiments, manipulating the configuration of least one corresponding arms comprises extending the at least one corresponding arms.

In some embodiments, each of the propulsion units comprises a rotor, and wherein adjust the distance comprises adjusting a distance from a rotational axis of the rotor to the central body.

In some embodiments, the unmanned aerial vehicle further comprises a plurality of rotors and a plurality of sets of rotor blades, wherein each of the propulsion units comprises a corresponding rotor, and each of sets of rotor blades is coupled to a corresponding rotor, and further comprising adjusting an angular velocity of at least one set of rotor blades in response to the change in the center of gravity of the unmanned aerial vehicle.

In some embodiments, the unmanned aerial vehicle further comprises a payload, and wherein manipulating a configuration of at least one of the corresponding arms in response to the change in a center of gravity of the unmanned aerial vehicle comprises manipulated the configuration in response to a change in a configuration of the payload.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1:
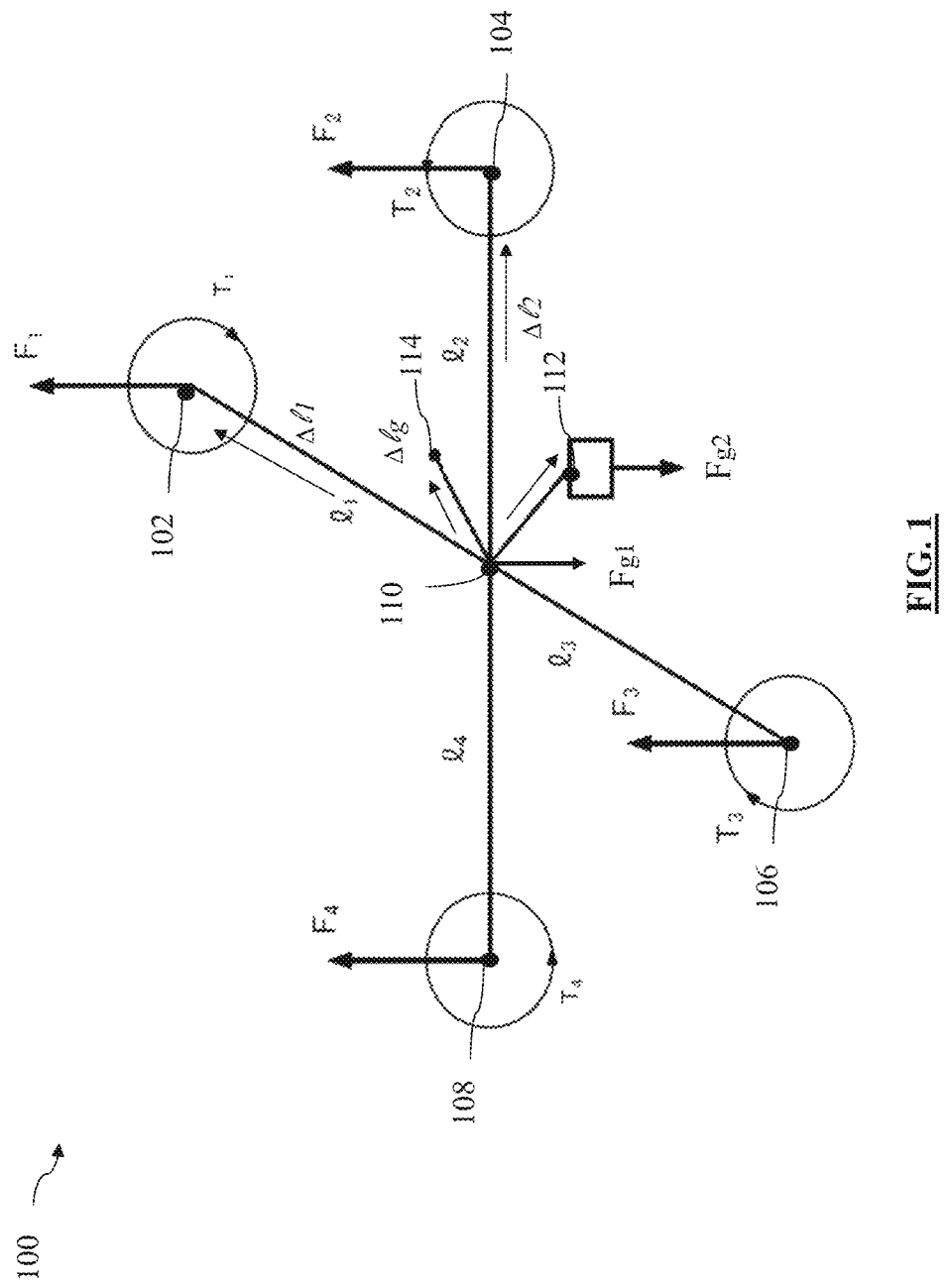
FIG. 1 is a schematic diagram showing an example of forces which can be exerted upon a UAV, according to some embodiments

The present disclosure provides improved systems and methods for operating a movable vehicle, including an unmanned vehicle, such as an unmanned aerial vehicle (UAV). A configuration of one or more components of a UAV may be adjusted in response to or in anticipation of a change in the center of gravity of the UAV. The center of gravity of the UAV may change due to the coupling, decoupling or change in configuration of a payload of the UAV. The configuration of one or more components of the UAV may be adjusted such that the center of thrust of the UAV can be shifted in response to or in anticipation of the change in the center of gravity of the UAV. The configuration of one or more components of the UAV may be adjusted so as to position of the center of thrust of the UAV at or proximate to the new center of gravity. As described herein, a component of the UAV may be an arm of the UAV and the length of the arm may be adjusted to position the center of thrust of the UAV at or proximate to the new center of gravity. The configuration of one or more components may be adjusted prior to flight, such as when the UAV is on a landing surface, and/or during flight. Adjustment in the configuration of the one or more components may be performed repeatedly throughout the flight to counter changes in the center of gravity of the UAV.

A UAV as described herein may comprise a plurality of arms extending outwardly from a central body. Each of the plurality of arms can be coupled to one or more propulsion units. Each propulsion unit may comprise a rotor, and a set of rotor blades can be coupled to each of the rotors. A distance from one or more of the rotors, and the set of rotor blades coupled to each of the one or more rotors, to the central body can be adjusted to shift the center of thrust of the UAV. For example, the distance from the rotational axis of a rotor to the central body can be adjusted so as to shift the center of thrust of the UAV. The aforementioned distance can be defined relative to any point on the central body. In some instances, a point on the central body may serve as a reference point from which the distance is defined. The reference point may be located, for example at the center of the central body. Alternatively, the reference point may be located at an edge of the central body. In some cases, the aforementioned distance can be defined relative to one or more planes. The one or more planes may intersect the central body. The planes may be orthogonal to one another. For example, a yaw axis, pitch axis, and roll axis of the central body of the UAV may lie on orthogonal planes intersecting the central body. In some embodiments, the one or more planes need not be orthogonal to one another. For example, the planes may be oblique to one another.

In some embodiments, a configuration of a corresponding arm to which the one or more rotors is coupled can be changed to change the distance between a rotor and the central body. For example, one or more of the plurality of arms coupled to the rotors can be configured to be extendable or retractable. The one or more arms may be extended or retracted to position the corresponding rotors further away from or closer to the central body of the UAV, respectively, such that the center of thrust of the UAV can be shifted to counter the shift in the center of gravity of the UAV. In some embodiments, the angular velocity of one or more sets of rotor blades may be adjusted, in combination with the length of the one or more arms, to counter the shift in the center of gravity of the UAV. For example, the angular velocities of the rotor blades and the lengths of the arms can be adjusted (in various combinations) to shift the center of thrust in accordance with the shift in center of gravity of the UAV.

In some embodiments, (1) the length of the one or more arms and/or (2) the angular velocity of one or more sets of rotor blades of the UAV, can be adjusted while the UAV is in flight. For example, the length of the one or more arms and/or the angular velocity of the one or more sets of rotor blades can be adjusted during flight prior to, during, or after a shift in the center of gravity of the UAV, to counter the shift in center of gravity. A shift in the center of gravity of the UAV may occur during flight, for example, due to a transformation in the configuration of a payload. A transformation in the configuration of the payload may occur during flight due to a change in the distribution of mass of the payload, and/or an increase or decrease in the mass of the payload, as described in further details herein. The length of the one or more arms and/or the angular velocity of the one or more sets of rotor blades can be adjusted prior to, during, or after the change in the configuration of the payload to shift the center of thrust of the UAV.

In some embodiments, the length of one or more arms coupled to a rotor can be adjusted prior to flight. The adjustment in the length of the one or more arms can be performed prior to flight in anticipation of a change in the center of gravity due to the presence of a payload or a change in the configuration state of the payload. The length of one or more arms coupled to a rotor can be adjusted prior to flight to facilitate providing a center of thrust at or proximate to the center of gravity of the UAV when the UAV is in flight. In some embodiments, prior to flight, one or more processors onboard the UAV may receive information relating to the type and/or configuration state of the payload, and the processors may determine an adjustment in the length of one or more arms of the UAV based on values stored in a memory table using the information of relating to the type and/or configuration state of the payload. For example, values stored in the memory may comprise values indicating the length of each of the arms of the UAV corresponding to different types of payloads and/or different payload configuration states. In some embodiments, values stored in the memory may comprise values indicating the change in length of one or more arms for corresponding payload types and/or payload configuration states.

Adjustment in the length of one or more arms of the UAV to provide a desired shift in the center of thrust of the UAV may reduce or eliminate the need to significantly change the angular velocity of one or more rotors to shift the center of thrust of the UAV. The rate at which the angular velocity of a rotor can be changed in response to shifts in the center of gravity, and/or the magnitude of change in the angular velocity of a rotor that can be made, may be hampered or limited by one or more electrical components. For example, the ability of one or more electrical components to deliver current to a rotor to effectuate the changes in angular velocity may be limited by one or more properties of the electrical component. A current supply may be limited, for example, due to a material composition of such electrical components. Materials used for such electrical components may exhibit degradation and/or damage above certain current thresholds, for example limiting the power supply to the UAV rotors, thereby adversely affecting flight stability of the UAV. Relying only upon the change in angular velocity of one or more rotors may thereby reduce the ability of the UAV to shift its center of thrust to counter a shift in the center of gravity. A UAV demonstrating a reduced ability to shift its center of thrust may be unstable during flight. A UAV with a reduced ability to adjust its center of thrust may also contribute to uneven wear of one or more of its components, including one or more of its propulsion units. Reliance only upon the angular velocity of one or more rotors may contribute to increased consumption of battery power.

One or more systems and/or methods described herein utilizing a change in the length of one or more arms to shift the center of thrust of the UAV can provide a UAV with improved ability to position the center of thrust at or proximate to the center of gravity of the UAV. Improved ability to position the center of thrust at or proximate to the center of gravity of the UAV can provided improved UAV stability during flight, and reduced uneven wear on one or more components of the UAV and/or reduced rate of battery power consumption.

It will be understood that while embodiments in the present disclosure may be primarily described with reference to unmanned aerial vehicles which are quadcopters, the methods and/or systems described herein are also applicable to unmanned aerial vehicles, such as multi-rotors, having a different number of rotors. The systems and/or methods described herein may be applied to unmanned aerial vehicles with more than four or fewer than four rotors. In some embodiments, the methods and/or systems described herein may be applied to tricopters, pentacopter, hexacopters and/or octocopters.

FIG. 1 is a schematic diagram showing an example of the forces which can be exerted upon a UAV 100, according to some embodiments. The UAV 100 is shown as a quadcopter in FIG. 1, comprising four propulsion units. Each of the four propulsion units can comprise a rotor, and a corresponding set of rotor blades coupled to each of the rotors. A rotor and a corresponding set of rotor blades can be positioned at a first rotor position 102, second rotor position 104, third rotor position 106 and fourth rotor position 108. Each of the rotors, and the sets of rotor blades coupled to the rotors, can be at an initial distance from an initial center of gravity of the UAV 100. For example, the first rotor position 102, second rotor position 104, third rotor position 106 and fourth rotor position 108 can be on the rotational axis of each of the respective rotors, such that the distance between the rotational axis of the first rotor, second rotor, third rotor, and fourth rotor, and an initial center of gravity 110 are $l_1$, $l_2$, $l_3$, and $l_4$, respectively. Each set of rotor blades and corresponding rotor may rotate about a rotational axis, such that the distance between the rotational axes of the first, second, third and fourth set of rotor blades, and an initial center of gravity 110 are given by $l_1$, $l_2$, $l_3$, and $l_4$, respectively.

Each of the four rotors may be supported on and/or coupled to a corresponding arm of the UAV 100. For example, the UAV 100 may have four arms extending outwardly from a central body. Each of the four rotors can be coupled to a corresponding arm of the UAV 100 such that the rotors are positioned at a desired distance from the central body. Torque can be applied to each of the four rotors to rotate each of the sets of rotor blades around a corresponding rotational axis so as to provide an upward force, or thrust, along the rotational axis. The thrust which can be generated by spinning the sets of rotor blades are shown as $F_1$, $F_2$, $F_3$ and $F_4$ in FIG. 1. Angular velocity of each of the sets of rotor blades can be adjusted to control the thrust $F_1$, $F_2$, $F_3$ and $F_4$ exerted upon the UAV 100.

A torque in the direction of rotation of each of the rotors may be exerted upon the UAV 100 due to rotation of each of the rotors around the corresponding rotational axis. The torque exerted upon the UAV 100 by each of the four sets of rotors is shown as $T_1$, $T_2$, $T_3$ and $T_4$, respectively. As shown in FIG. 1, adjacent rotors can be rotated in opposing directions such that the corresponding torques are in opposite directions. During flight, $F_1$, $F_2$, $F_3$, $F_4$, $T_1$, $T_2$, $T_3$ and $T_4$ can be adjusted to control the attitude of the UAV 100, for example by adjusting the angular velocity of the corresponding rotor.

The UAV 100 can have an initial center of gravity at its initial center of gravity position 110, and the magnitude of the force exerted by gravity upon the UAV 100 is shown as $F_{g1}$. In some cases, the initial center of gravity position 110 can be at an intersection of a first line extending between the first rotor and the third rotor, such as between the rotational axes of the first and third rotors, and a second line extending between the second rotor and the fourth rotor, such as between the rotational axes of the second and fourth rotors. In some embodiments, the first and second lines can be orthogonal to one another. In some embodiments, the first and second lines bisect each other such that the initial center of gravity position 110 is at a midpoint on both the first and second lines. In some embodiments, the initial center of gravity position 110 of the UAV 100 can be at the center of the central body. In some embodiments, the initial center of gravity position 110 of the UAV 100 can be at a position other than the center of the central body.

In some embodiments, the center of gravity of the UAV 100 can shift from the initial center of gravity position 110. For example, as shown in FIG. 1, the center of gravity of the UAV 100 can change from its initial center of gravity position 110 to a second center of gravity position 112, and the force exerted upon the UAV 100 after the shift in center of gravity of the UAV 100 is shown as $F_{g2}$. In some embodiments, a shift in the center of gravity of the UAV 100 can be accompanied by a change in mass of the UAV 100 such that $F_{g1}$ and $F_{g2}$ are different. In some embodiments, a shift in the center of gravity of the UAV 100 is not accompanied by a change in mass of the UAV 100, such that $F_{g1}$ is equal to $F_{g2}$. The change in center of gravity of the UAV 100 can occur due to a change in configuration of one or more components of the UAV 100. For example, a change in the center of gravity can occur due to coupling or decoupling (e.g., attachment or release) of a payload from the UAV 100. In some embodiments, a shift in the center of gravity of the UAV 100 can occur due to a change in configuration of a payload of the UAV 100. For example, the payload may comprise a telescoping feature which may be extended or retracted, and that can change the configuration of the payload. As shown in FIG. 1, according to some embodiments, a telescoping feature of the payload may be extended a length $\Delta l_g$ such that a distal portion of the telescoping feature is at an extended position 114. This extension of the telescoping feature cause the initial center of gravity position 110 of the UAV 100 to shift to the second center of gravity position 112.

The center of thrust of the UAV 100 (not shown) may be adjusted to counter the shift in the center of gravity of the UAV 100. In some embodiments, the initial position for the center of thrust of the UAV 100 may be at or proximate to the initial center of gravity position 110. The center of thrust of the UAV 100 may be shifted from its initial position to a second position to counter the shift in the center of gravity. For example, the center of thrust of the UAV 100 may be shifted to a second position such that its second position is at or proximate to the second center of gravity position 112. The position of one or more of the first, second, third and fourth rotors can be adjusted to shift the center of thrust of the UAV 100. For example, one or more of the first, second, third and fourth rotors can be positioned closer to or further away from the central body of the UAV 100 to shift the center of thrust. In some embodiments, the positions of one or more of the rotors can be adjusted relative to a reference point on the central body. The reference point may be located anywhere on the central body. For example, the reference point can be at the center of the central body. In some alternative embodiments, the reference point may be located external to the central body. One or more of the lengths $l_1$, $l_2$, $l_3$, and $l_4$ can be adjusted to shift the center of thrust. In some embodiments, the length of one or more arms of the UAV 100 can be adjusted to achieve to desired change in one or more of $l_1$, $l_2$, $l_3$, and $l_4$. For example, the one or more arms of the UAV 100 can be extended or retracted to place one or more corresponding rotors at the desired positions.

Referring to FIG. 1, as an example, the first and second rotors can be repositioned to achieve the desired shift in the center of thrust of the UAV 100. For example, the lengths $l_1$ and $l_2$ can be changed to counter the change of the center of gravity from the first center of gravity position 110 to the second center of gravity position 112. The lengths $l_1$ and $l_2$ can be changed by $\Delta l_1$ and $\Delta l_2$, respectively, such that the center of thrust of the UAV 100 can be positioned at or proximate to the second center of gravity position 112. A configuration of the corresponding arms to which the first and second rotors are coupled can be changed to reposition the first and second rotors, such as by extending each of the corresponding arms. A change to the configuration of one or more arms can be made prior to and/or during flight. For example, the change to the configuration can be made during flight prior to, during, or after the change in the center of gravity has occurred. In some embodiments, the change to the configuration can be made prior to flight based on information relating to the type and/or configuration state of the payload.

A configuration of one or more arms of the UAV 100 can be changed to shift the center of thrust of the UAV 100, in order to counter a shift in the center of gravity of the UAV 100. The configuration of the one or more arms can be changed such that that the center of thrust of the UAV 100 can be at or proximate to the new center of the gravity. Changing the configuration of the arms to change the center of thrust of the UAV 100 can reduce operational burden on the rotors (and rotor blades). This can advantageously provide a UAV 100 demonstrating increased uniformity in wear of components of the UAV 100, for example such that none of the rotors exhibit increased wear relative to other rotors of the UAV 100. Reduced burden on the rotors (and rotor blades) may provide reduced consumption of battery power, and/or improved stability during flight.

As previously mentioned, a change in the center of gravity of UAVs can occur due to coupling or decoupling of a payload, and/or a change in configuration of a payload. In some embodiments, a payload can be coupled to or decoupled from a UAV prior to flight. For example, the configuration of one or more arms of the UAV can be adjusted prior to flight to account for the coupling or decoupling of the payload. In some embodiments, a change in the configuration of the payload can occur due to a change in the distribution of mass of the payload during flight. In some embodiments, a change in the distribution of mass of the payload may result from movement of the content of the payload. The content may be a solid or a fluid. In some embodiments, the payload may be carrying content that becomes rearranged during flight, such as shifting around of items in a container (e.g., a sack, a bottle, and/or a box) carried by the payload.

In some embodiments, the change in distribution of mass of the payload may be due to a change in a configuration state of the payload. The change in the configuration state of a telescoping feature of the payload may result in a change in the center of gravity of the UAV. For example, a telescoping feature of the payload can extend or retract during flight, changing the distribution of mass of the payload, and thereby shifting the center of gravity of the UAV. In some embodiments, the telescoping feature can be a telescoping arm, or a foldable arm. For example, a foldable arm in an extended state may be configured to carry one or more instruments at a distal portion away from the central body of the UAV to deliver the one or more instruments to a target. The foldable arm may be retracted when the UAV is on a landing surface and/or when the UAV is in flight traveling to a target destination, and can be extended to deliver the one or more instruments to a target after the UAV reaches the target destination. After delivery of the instrument to the target and/or completion of the task using the one or more instruments at the target destination, the foldable arm may be retracted. The foldable arm may be folded into a reduced profile configuration when not in use to facilitate movement and/or storage of the UAV. A variety of instruments may be delivered by the foldable arm, including but not limited to, cleaning instruments, cutting instruments, and/or containers.

In some embodiments, the telescoping feature may be a part of an imaging device comprising an extendable lens unit, such as an extendable lens barrel. For example, the payload may comprise a camera or other imaging device comprising an extendable lens unit. The lens unit may be extended or retracted to change the focal length of the lens unit so as to facilitate imaging of targets. The extension and/or retraction of the lens unit can shift the distribution of mass of the payload, thereby shifting the center of gravity of the UAV. In some embodiments, a telescoping feature may comprise a retractable spray nozzle, for example for use in various agricultural applications for delivering one or more chemical compounds to any number of crops, such as on UAVs used as crop dusters. For example, the retractable nozzle may be extended after the UAV reaches the target destination for delivering the one or more chemical compounds to the target destination, and may be subsequently retracted after completion of the delivery. Changes in configuration state of the payload other than extension and retraction of a telescoping feature may also result a shift in the center of gravity of a UAV, including a rotation of one or more components of the payload, and/or a translational movement of the payload.

In some embodiments, a change in the configuration of the payload can occur due to a gain and/or loss in the mass of the payload. For example, content of the payload may be increased and/or decreased during flight. In some embodiments, the content of the payload may be dispensed and/or refilled during flight. In some embodiments, the payload can pick up or drop off a portion or all of its content. The gain and/or loss of mass of the payload may cause a shift in the center of gravity of the UAV such that the configuration of one or more arms of the UAV coupled to a rotor can be changed to counter the shift in the center of gravity, such as by extending or retracting the one or more arms.

Figure 2:
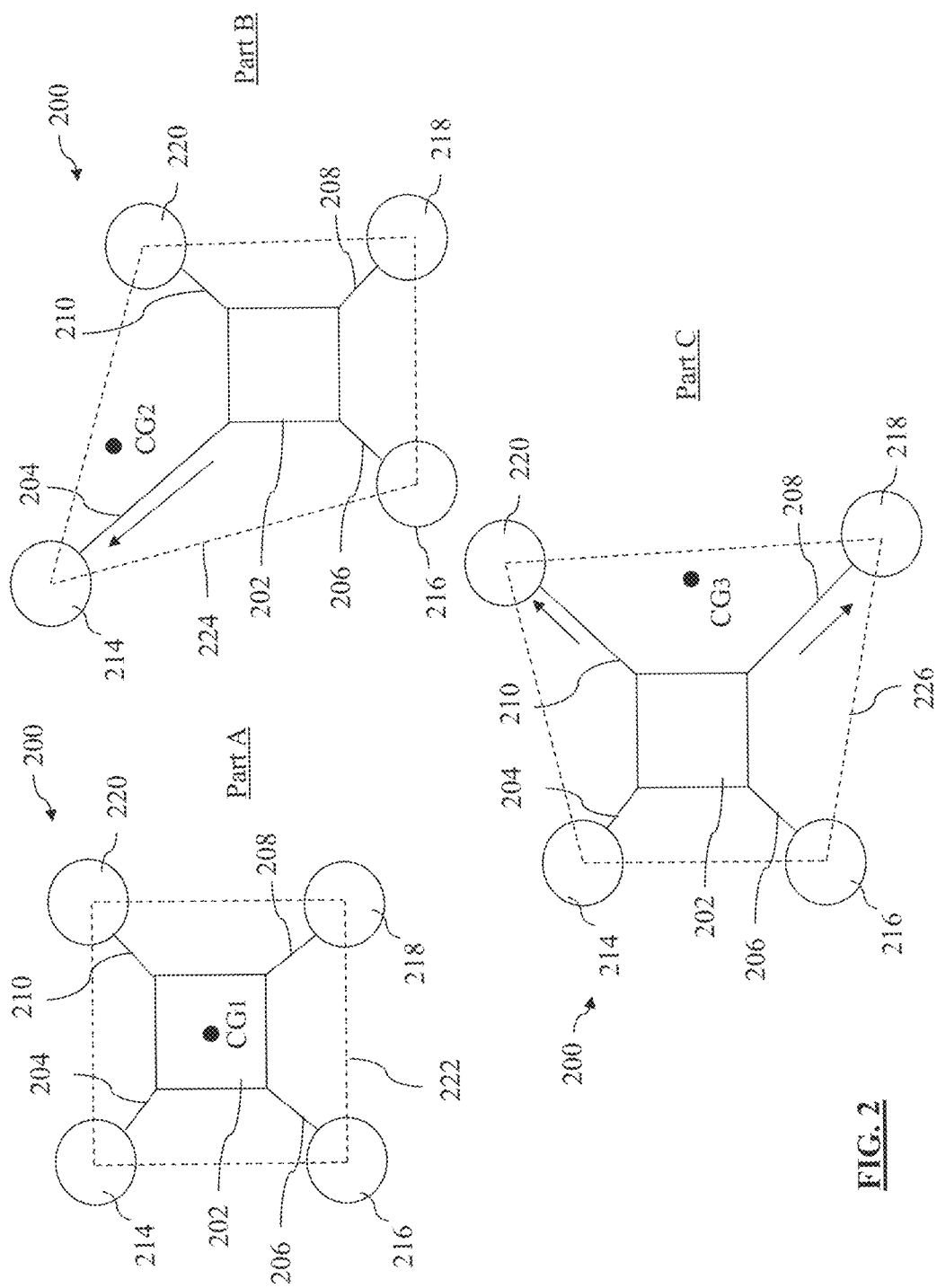
FIG. 2 shows schematic diagrams of a UAV comprising one or more arms in various configuration states, according to some embodiments.

Referring to FIG. 2, schematic diagrams of a UAV 200 comprising one or more arms in various configuration states are shown. In Part A of FIG. 2, the UAV 200 is shown in an initial state, or a first state. The UAV 200 may be landed on a surface or in flight in its initial state, including in flight and in motion or in flight and hovering at a spot. The UAV 200 can have a central body 202, and a plurality arms extending outwardly form the central body 202. The UAV 200 may be a quadcopter, including a first arm 204, a second arm 206, a third arm 208 and a fourth arm 210, extending outwardly from the central body 202. Each of the arms 204, 206, 208 and 210 may comprise a corresponding propulsion unit coupled to the arm. Each propulsion unit may comprise a rotor to which a set of rotor blades are coupled. For example, a first set of rotor blades 214, second set of rotor blades 216, third set of rotor blades 218 and fourth set of rotor blades 220 may be coupled to a rotor on each of the first arm 204, second arm 206, third arm 206 and fourth arm 208, respectively. For illustrative purposes, the central body 202 of the UAV 200 is shown to have a square or substantially square shape, each of the four arms 204, 206, 208 and 210 extending outwardly from a connection portion between adjacent sides of the square. The central body 202 may have other suitable shapes, such as a rectangular shape, and/or a rounded shape. The arms may extend from the central body 202 at positions other than from the connection portion between adjacent lateral sides.

The UAV 200 in its first state can have an initial center of gravity at $CG_1$. $CG_1$ can be at a position on central body 202 of the UAV 200. In some embodiments, the center of thrust of the UAV 200 can be at or proximate to $CG_1$ in its first state. As described herein, adjusting the angular velocity of one or more rotors of a UAV 200 can be used to adjust the center of thrust of the UAV 200. Part A of FIG. 2 shows a top down schematic diagram of a zone 222 within which the center of thrust of the UAV 200 can be adjusted by changing the angular velocity of one or more rotors of the UAV 200, without changing the length of any of the arms 204, 206, 208 and 210. For example, the zone 220 may comprise a lateral boundary having sides which extend between the rotational axes of adjacent rotors, such that adjusting the angular velocity of one or more rotors may allow shifting of the center of thrust of the UAV 200 to a point within the zone 222, or a point on the boundary of the zone 222.

Part B of FIG. 2 shows the UAV 200 in a second state. In Part B of FIG. 2, the center of gravity of the UAV 200 in the second state is shown as having shifted to a second position $CG_2$. As described herein, a shift in the center of gravity can be due to coupling or decoupling of a payload and/or a change in configuration of a payload of the UAV 200. One or more of the rotors of the UAV 200 can be repositioned in response to the change in the center of gravity. As shown in Part B of FIG. 2, the configuration of an arm can be changed, such as by extending the length of an arm of the UAV 200, in response to the shift in the center of gravity of the UAV 200. For example, in the second state, the length of the first arm 204 of the UAV 200 may be extended to shift the center of thrust of the UAV 200 in response to the shift in the center of gravity of the UAV 200.

Extension of one or more arms of the UAV 200 may expand the zone within which the center of thrust of the UAV 200 can be shifted. For example, as shown in Part B of FIG. 2, the zone 224 within which the center of thrust of the UAV 200 may be shifted while the UAV 200 is in its second state may be larger than the zone 222 as described with reference to Part A. The zone 224 may comprise a lateral boundary comprising sides extending between rotational axes of adjacent rotors of the UAV 200, including between the rotational axis of the rotor coupled to extended first arm 204 and rotors coupled to corresponding adjacent arms 206, 210. The zone 224 can encompass a space larger than that of the zone 220 described with reference to Part A of FIG. 2, for example, as the rotor coupled to the extended first arm 204 is positioned further away from the central body 202 of the UAV 200. The second center of gravity position $CG_2$ may be outside of the zone 222 of the UAV 200 in its initial state, while remaining within the zone 224 of the UAV 200 in the second state. Extending the first arm 204 may facilitate adjusting the position of the center of thrust of the UAV 200 such that it is positioned at or proximate to the third center of gravity position $CG_2$. In some embodiments, extending one or more arms of the UAV 200 may expand the zone within which its center of thrust can be shifted, improving the ability of the UAV 200 to respond to changes in its center of gravity.

In some embodiments, the configuration of more than one of the arms of the UAV 200 can changed in response to a shift in the center of gravity of the UAV 200. For example, two of the arms of the UAV 200 may be extended for adjusting the center of thrust of the UAV 200 in response to a shift in the center of gravity of the UAV 200. Part C of FIG. 2 shows the UAV 200 in a third state. In Part C of FIG. 2, the center of gravity of the UAV 200 is shown to have shifted to a third center of gravity position $CG_3$. The configuration of two of the arms of the UAV 200, such as the third arm 208 and fourth arm 210 can be adjusted to counter the shift in the center of gravity. The third arm 208 and fourth arm 210 may be extended to reposition the corresponding rotors coupled to the third arm 208 and the fourth arm 210 in response to the change in the center of gravity. For example, the third arm 208 and fourth arm 210 may be extended to reposition the corresponding rotors such that the third center of gravity position $CG_3$ can be within the zone 226 within which the center of thrust of the UAV 200 can be shifted. The zone 226 within which the center of thrust can be positioned may comprise a lateral boundary having sides extending between rotational axes of adjacent rotors, including rotors coupled to the extended third arm 208 and fourth arm 210. Extending the arms 208, 210 may facilitate adjusting the position of the center of thrust of the UAV 200 such that it is positioned at or proximate to the third center of gravity position $CG_3$.

In some embodiments, one or more arms of the UAV 200 can be further adjusted in response to a subsequent change in the center of gravity of the UAV 200. For example, after retraction of an extended telescoping feature of a payload, the one or more extended arms of the UAV 200 may be retracted in response to the change of the center of gravity of the UAV 200 back to the initial state. In some embodiments, the angular velocity of one or more rotors of the UAV 200 may be adjusted, in combination with a change in the length of the one or more arms, to counter a shift in the center of gravity of the UAV 200. In some embodiments, the one or more rotors may be rotors coupled to the one or more extended or retracted arms. In some embodiments, the one or more rotors are on one or more other arms of the UAV 200.

Figure 3:
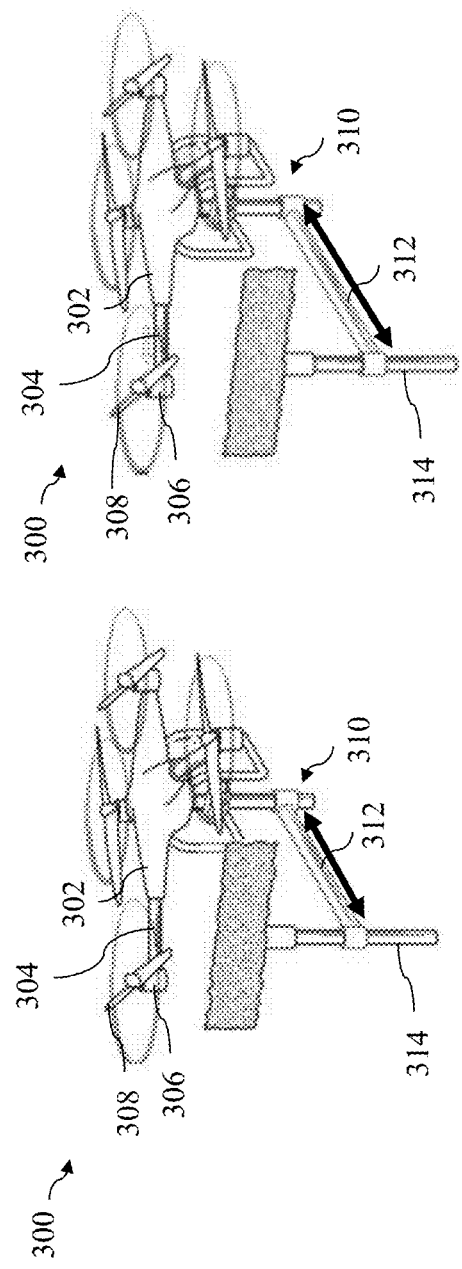
FIG. 3 shows schematic diagrams of a UAV comprising a payload which has a telescoping arm, according to some embodiments.

FIG. 3 show schematic diagrams of a UAV 300 supporting a payload 310 which has a telescoping arm 312. The UAV 300 may have one or more features of other UAVs described herein. For example, the UAV 300 may be a quadcopter comprising four arms 304 extending from a central body 302, each of the arms 302 supporting a corresponding rotor 306, and a set of rotor blades 308 coupled to each of the rotors 306. As shown in Part A and Part B of FIG. 3, the telescoping arm 312 may be extended or retracted. A cleaning instrument 314 may be coupled to a distal portion of the telescoping arm 312, for example for delivery of the cleaning instrument 314 to a target destination (e.g., a dirty window). The cleaning instrument 314 is shown for illustrative purposes. Any number of other implements suited to the task for which the UAV 300 is applied may be carried by the telescoping arm 312. For example, the telescoping arm 312 may assume a reduced profile configuration during travel to and/or away from the target destination, such as shown in Part A, for example to facilitate movement of the UAV 300. The telescoping arm 312 may assume an extended configuration, such as shown in Part B, prior to, including immediately prior to, after, including immediately after, the UAV 300 has reached the target destination, or as the UAV 300 is approaching the target destination, so as to facilitate contact of the cleaning instrument 314 with one or more surfaces at the target destination.

The center of gravity of the UAV 300 may shift due to the extension and/or retraction of the telescoping arm 312. Extension or retraction of one or more arms 304 of the UAV 300, along with adjustment in the angular velocity of one or more rotors 306 coupled to the arms of the UAV 300, can be used to shift the center of thrust of the UAV 300 to counter the shift in the center of gravity of the UAV 300. As shown in Part B, two of the four arms 304 of the UAV 300 extending from the side of the central body 302 on which the telescoping arm 312 is extended, can be lengthened to reposition the rotors 306 coupled to the two arms 304. For example, the rotors 306 at the distal portions of the two arms 304 can be positioned further away from the central body 302 to facilitate the shift in the center of thrust of the UAV 300.

Figure 4:
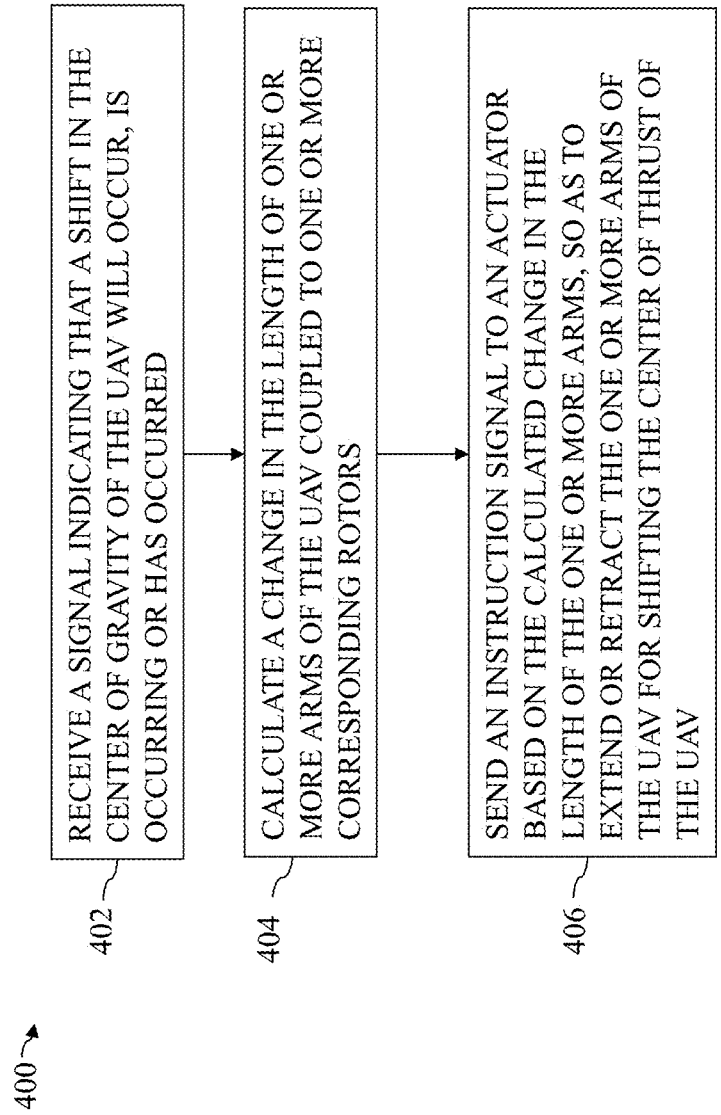
FIG. 4 is a flowchart of a method for changing the length of one or more arms of the UAV during flight, according to some embodiments.

One or more processors of a UAV can be configured to determine the change in length of one or more arms of a UAV in response to a shift in center of gravity of the UAV. Referring to FIG. 4, a flowchart of an exemplary 400 for changing the length of one or more arms of the UAV during flight is provided. In block 402, one or more processors of the UAV can receive a signal indicating a change in the center of gravity of the UAV will occur, is occurring or has occurred. In some embodiments, a signal indicating a change in the center of gravity has occurred may comprise information measured by and/or derived from values measured by one or more sensors on the UAV, such as one or more sensors configured to provide information relating to the position and/or orientation of the UAV. For example, the processors may receive information from a gyroscope, inertial measurement unit (IMU), mass sensor, accelerometer, magnetometer, global positioning system (GPS) receiver, combinations thereof, and/or the like. One or more signals from the sensors of the UAV may provide attitude information indicating that the UAV has experienced a shift in position and/or orientation. In some embodiments, the signal indicating a change in the center of gravity (i) will occur, (ii) is occurring or (iii) has occurred may comprise a signal indicating a change in the configuration of a payload carried by the UAV will occur, is occurring or has occurred. In some embodiments, the signal may comprise information relating to the configuration state of the payload prior to and/or after the configuration change. For example, the signal may include information indicating that a telescoping feature of the payload will be, is being, or has been extended or retracted, and information regarding the extent to which the telescoping feature will be, is being, or has been extended or retracted. In some embodiments, the signal may comprise information relating to the gain or loss of mass by the payload. In some embodiments, the signal may include information relating to the redistribution of mass of content of the payload.

In response to the received signals from the one or more sensors, the processors may perform various calculations to determine the change in length of one or more arms. Referring back to FIG. 4, in block 404, the processors can calculate a change in the length of one or more arms of the UAV coupled to one or more rotors. As described in further detail herein, the processors of the UAV may receive various measurements from one or more sensors on the UAV for use in the calculation of the change in the length of the one or more arms. In block 406, the processors may send an instruction signal to an actuator based on the calculated change in the length of the one or more arms, so as to extend or retract the one or more arms of the UAV to shift the center of thrust of the UAV in response to the change in the center of gravity of the UAV. The actuator for extending or retracting the one or more arms may be a linear actuator. The linear actuator may be on the central body and/or on the one or more arms. The linear actuator may be configured to apply a linear force upon a portion of the one or more arms to extend or retract the one or more arms. In some embodiments, angular velocity of one or more of the rotors of the UAV may be adjusted, in combination with the change in length of the one or more arms, to shift the center of thrust of the UAV to counter the change in the center of gravity. The center of thrust of the UAV may be shifted in response to the shift in the center of gravity of the UAV such that the center of thrust can be at or proximate to the new center of gravity of the UAV.

Determination of the change in the length of one or more arms of the UAV can be performed using equations which characterize the translational and rotational motion of the UAV. The translational motion of a UAV, such as a multi-rotor UAV, can be characterized by equation (1), where $\ddot{x}$, $\ddot{y}$ and $\ddot{z}$, are the translational acceleration of the UAV along the x-axis, y-axis and z-axis in the world coordinate system, respectively. m in equation (1) is the mass of the UAV and g is the earth gravitational acceleration constant. $F_p$ is the thrust provided by rotation of the rotor blades of the UAV. $F_p$ is expressed in the body frame coordinate system of the UAV, and the equation for characterizing $F_p$ is shown in equation (2). R is the transform matrix for transforming coordinates in the body frame coordinate system to coordinates in the world coordinate system, or the inertial frame coordinate system. The equation for R is shown in equation (3).

$$\begin{bmatrix} \ddot{x} \\ \ddot{y} \\ \ddot{z} \end{bmatrix} = R \cdot \frac{F_p}{m} - \begin{bmatrix} 0 \\ 0 \\ g \end{bmatrix} = \frac{k_m \sum_{i=1}^{4} \omega_i^2 \begin{bmatrix} \cos\Psi\sin\Theta\cos\Phi + \sin\Psi\sin\Phi \\ \sin\Psi\sin\Theta\cos\Phi - \sin\Phi\cos\Psi \\ \cos\Theta\cos\Phi \end{bmatrix}}{m} - \begin{bmatrix} 0 \\ 0 \\ g \end{bmatrix} \quad (1)$$

$$F_p = \begin{bmatrix} 0 \\ 0 \\ k_m \sum_{i=1}^{4} \omega_i^2 \end{bmatrix} \quad (2)$$

$$R = \begin{bmatrix} \cos\Psi\sin\Theta\cos\Phi + \sin\Psi\sin\Phi \\ \sin\Psi\sin\Theta\cos\Phi - \sin\Phi\cos\Psi \\ \cos\Theta\cos\Phi \end{bmatrix} \quad (3)$$

In equation (2), $k_m$ is a constant coefficient for relating angular velocity ω of the rotors to the output thrust, and $\omega_i$ is the angular velocity of rotor i of the UAV. In equation (3), Φ is the roll angle, or rotation of the UAV around the x-axis, Θ is the pitch angle, or the rotation of the UAV around the y-axis, and ψ is the yaw angle, or the rotation of the UAV around the z-axis.

The rotational motion of the UAV around the x-axis, y-axis and z-axis, or the roll, pitch, and yaw of the UAV, respectively, can be characterized by equation (4). $\ddot{\Phi}$ is the roll angular acceleration, or the angular acceleration of the UAV rotation around the x-axis. $\ddot{\Theta}$ is the pitch angular acceleration, or the angular acceleration of the UAV rotation around the y-axis, and $\ddot{\Psi}$ is the yaw angular acceleration, or the angular acceleration of the UAV rotation around the z-axis.

$$\begin{bmatrix} \ddot{\Phi} \\ \ddot{\Theta} \\ \ddot{\Psi} \end{bmatrix} = \begin{bmatrix} \{l_4 k_m \omega_4^2 - l_2 k_m \omega_2^2 + \dot{\Theta}\dot{\Psi}(I_y - I_z)\}/I_x \\ \{l_3 k_m \omega_3^2 - l_1 k_m \omega_1^2 + \dot{\Phi}\dot{\Psi}(I_z - I_x)\}/I_y \\ \{k_d \omega_1^2 - k_d \omega_2^2 + k_d \omega_3^2 - k_d \omega_4^2 + \dot{\Phi}\dot{\Theta}(I_x - I_y)\}/I_z \end{bmatrix} \quad (4)$$

Equation (4) can be used to characterize the rotational motion of a UAV with four sets of rotors coupled to four corresponding arms, where is the distance between the rotational axis of rotor i and the center of gravity of the UAV, and $\omega_i$ is the angular velocity of rotor i, where i=1, 2, 3 and 4. $\dot{\Phi}$, $\dot{\Theta}$, and $\dot{\Psi}$ are the roll, pitch and yaw angular velocities of the UAV, or the angular velocities of the UAV around the x-, y- and z-axis, respectively. $I_x$, $I_y$, and $I_z$ are the moments of inertia along the x-axis, the y-axis and the z-axis, respectively, of the UAV. In some embodiments, $I_x$, $I_y$, and $I_z$ may be approximated using predetermined constants. $K_d$ can be a constant coefficient for relating the output torque of the rotors and angular velocity ω of the rotors.

The equations described herein can be used to determine the length to which one or more of the arms of the UAV are to be adjusted and/or the extent of the change to the length of the one or more arms. One or more processors of the UAV may receive one or more measurements and/or one or more values derived from measurements made by one or more sensors of the UAV as input to the equations described herein. For example, the processors may receive measurements for and/or derive values based on measurements received for roll angle ($\Phi$), pitch angle ($\Theta$), yaw angle ($\Psi$), and angular velocities for $\Phi$, $\Theta$ and $\Psi$, from one or more sensors on the UAV. In some embodiments, the processors can receive information from one or more of a gyroscope, inertial measurement unit (IMU), accelerometer, and mass sensor, GPS sensor, combinations thereof, and/or the like. The processors may use such measurements and/or values derived from such measurements in one or more equations described herein for calculating a change in the length of one or more arms of the UAV. In some embodiments, the processors may use such measurements and/or values derived from such measurements in equations described herein for calculating both a change in the length of one or more arms of the UAV and a change in the angular velocity of one or more rotors of the UAV.

Figure 5:
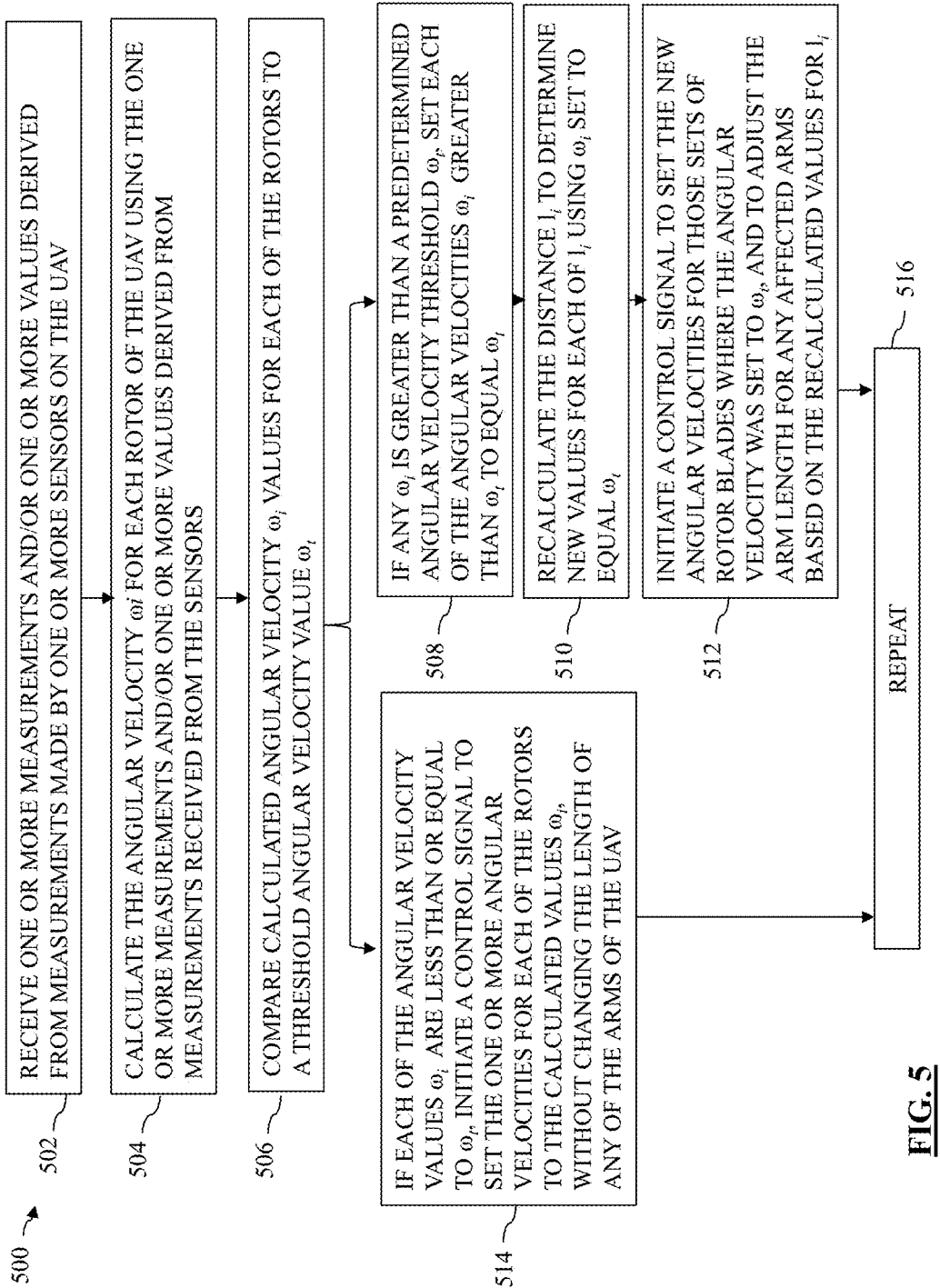
FIG. 5 is a flowchart of a method for determining a change in the length of one or more arms to counter a shift in the center of gravity of a UAV, according to some embodiments.

Referring to FIG. 5, a flowchart of another exemplary method 500 for determining a change in the length of one or more arms to counter a shift in the center of gravity of a UAV during flight is shown. In block 502, one or more processors of the UAV can receive one or more measurements and/or one or more values derived from measurements received from one or more sensors on the UAV. In some embodiments, the one or more measurements may include one or more of the pitch angle, roll angle and yaw angle of the UAV. In some embodiments, the one or more measurements can include one or more of the pitch angular velocity, roll angular velocity and yaw angular velocity of the UAV. The one or more sensors may include, for example, a gyroscope, inertial measurement unit (IMU), accelerometer, and mass sensor, GPS sensor, combinations thereof, and/or the like. In block 504, the processors can calculate the angular velocity $\omega_i$ for each rotor of the UAV using the one or more measurements and/or one or more values derived from measurements received from the one or more sensors. The equations characterizing the translational and rotational motion of the UAV as described herein can be used to calculate the angular velocities $\omega_i$. Previously known $l_i$ values for the distances of the rotational axes of each of the rotors from the center of gravity of the UAV can be used for the calculations. For example, the angular velocities co, for each of the rotors of a quadcopter, where i=1, 2, 3, 4, can be determined.

In block 506, the calculated angular velocity $\omega_i$ values for each of the rotors can be compared to a threshold angular velocity value $\omega_t$. In some embodiments, the threshold angular velocity value $\omega_t$ can be selected based on characteristics of one or more electrical components of the UAV. The angular velocity of each of the rotors may be limited at least in part by the ability to supply current to one or more electrical components, such as to an electrical rotor for spinning the rotors. In some embodiments, the value of $\omega_t$ may be selected to avoid or prevent excess load placed upon the one or more electrical components. For example, $\omega_t$ may be selected such that the current supplied to a rotor remains below an upper current limit. In some embodiments, the upper current limit may be a current above which the one or more electrical components of the UAV may be damaged and/or degraded, such as one or more electrical components for supplying current to the rotor. In some embodiments, $\omega_t$ may be selected to provide desired battery performance, for example so as to provide reduced battery consumption. In some embodiments, $\omega_t$ can be about 500 radians/second. In other embodiments, $\omega_t$ can be greater than or less than 500 radians/second.

In block 508, if any of the calculated angular velocities $\omega_i$ is greater than $\omega_t$, the angular velocity $\omega_i$ for each of the sets of rotor blades where $\omega_i$ is greater than the predetermined angular velocity threshold $\omega_t$ can be set to equal the predetermined angular velocity threshold $\omega_t$. For example, each of the angular velocity values $\omega_i$ greater than 500 radians/second may be set to 500 radians/second. In block 510, the distance $l_i$ can be recalculated to determine new values for each of $l_i$ using the new angular velocity values (i.e., where $\omega_i$ has been set to equal $\omega_t$). In block 512, the processors can initiate a control signal to set the new angular velocities for those sets of rotor blades where the angular velocity was set to $\omega t$, and to adjust the arm length for any affected arms based on the new values for $l_i$. For example, a control signal may be generated to set the angular velocity of one or more rotors to 500 radians/second and to set the length of one or more arms to the recalculated $l_i$.

In block 514, if all of the angular velocity values $\omega_i$ calculated in block 504 are less than or equal to $\omega_t$, the processors can initiate a control signal to set the one or more angular velocities for each of the rotors to the calculated values $\omega_i$, without changing the length of any of the arms of the UAV. In some embodiments, as shown in block 516, the steps of calculating $\omega_i$ and/or $l_i$ can be repeated any number of times in response to additional or subsequent shifts in the center of gravity of the UAV.

As described herein, in some embodiments, the length of one or more arms of the UAV can be adjusted prior to flight. One or more arms of the UAV coupled to one or more rotors may be extended or retracted while on a landing surface in anticipation of a change in the center of gravity of the UAV that would otherwise occur. For example, a change in the center of gravity of the UAV may occur after take-off due to the presence or absence of a payload and/or a configuration state of the payload, which has not been accounted for. For example, prior to flight, one or more processors of the UAV may receive information indicating that a payload has been detected or that a payload is absent, and/or that the configuration state of a payload is different from a previously known state of the payload. The processors can determine, based on the information relating to the presence and/or configuration state of the payload, whether the length of any arms of the UAV coupled to a propulsion unit is changed, as well as the change to the length of the one or more arms. In some embodiments, the length of the one or more arms of the UAV may be adjusted prior to flight or after take-off to facilitate positioning the center of thrust of the UAV at or proximate to the center of gravity of the UAV.

Figure 6:
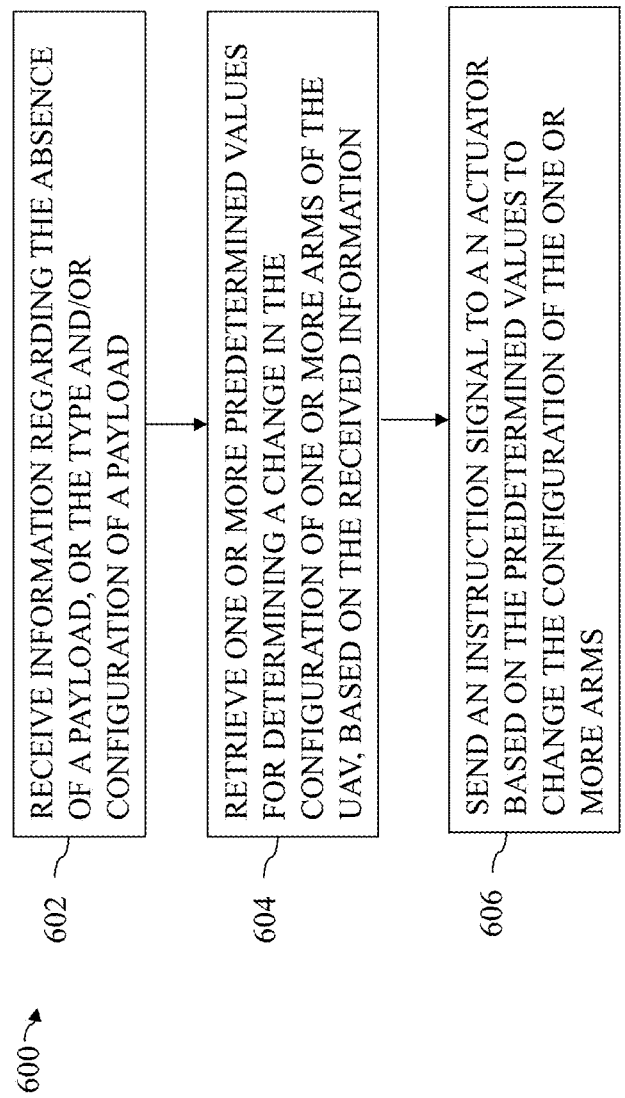
FIG. 6 is a process flow diagram of an example of a process for changing the configuration of one or more arms of a UAV prior to flight, according to some embodiments.

Referring to FIG. 6, a flowchart of an exemplary method 600 is shown for changing the configuration of one or more arms of a UAV prior to flight. In block 602, one or more processors of the UAV can receive information regarding the absence of a payload, or the type and/or configuration of a payload. In some embodiments, the UAV may receive the information from one or more sensors on the UAV indicating whether a payload is absent or present. For example, the UAV may comprise various sensors to determine whether coupling components of a payload are present within corresponding mating components. If a payload is present, the processors may receive from one or sensors information relating to the type and/or configuration of the payload. In some embodiments, the processors may be able to communicate with the payload such that the processors can receive from the payload information regarding the type and/or configuration state of the payload. In some embodiments, the type and/or configuration of the payload may be manually entered by a user through a user interface on the UAV, or via a remote user terminal that is configured to control the UAV.

In block 604, the processors can retrieve one or more predetermined values for determining the change in the configuration of one or more arms of the UAV, based on the information received regarding the absence of a payload, or the type and/or configuration of a payload. In some embodiments, the predetermined values can comprise values indicating which one or more arms are affected and the change to the configuration of the affected arms, such as the change in length of the one or more arms. In some embodiments, the one or more predetermined values can be used in the calculations for determining the change in the length of one or more arms. In some embodiments, the predetermined values may be stored in a memory of the UAV, such as a table in memory that is accessible by the processors. For example, in response to information received regarding the absence, or the type and/or configuration state of the payload, the UAV may select from the table in the memory predetermined values indicating the length of which one or more arms of the UAV should be adjusted and the change in the length for the one or more arms. In some embodiments, further calculations are performed using values stored in the memory onboard the UAV to determine which of the one or more arms are to be extended or retracted, and the change in the length of the one or more arms. In block 606, an instruction signal can be sent by the processors to an actuator for changing the configuration of the one or more arms based on the predetermined values.

Figure 7:
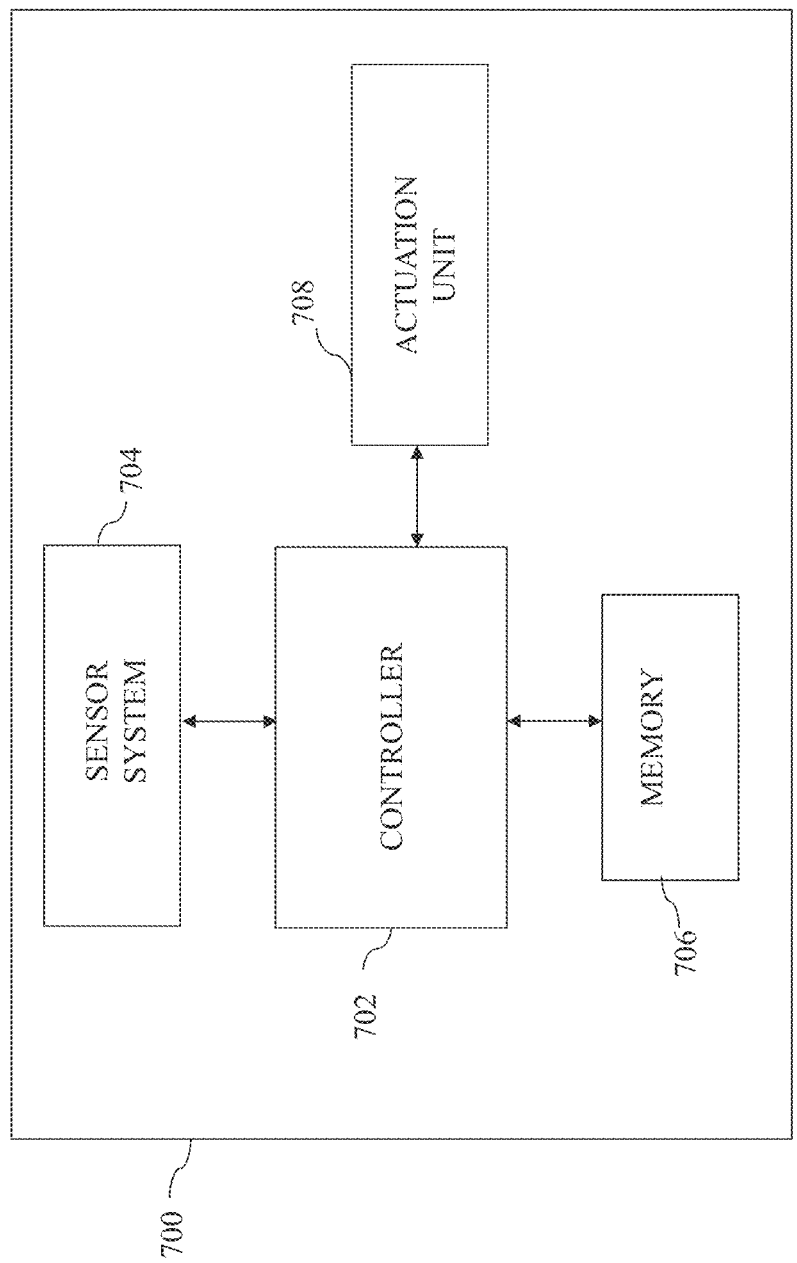
FIG. 7 is a block diagram of an example of a system configured to effect a change in the configuration of one or more arms of a UAV, according to some embodiments.

One or more methods for changing the configuration of one or more arms, and/or angular velocities of one or more rotors of a UAV may be implemented using one or more systems as described herein. FIG. 7 is a schematic diagram of an example of a system 700 configured to effect a change in the configuration of one or more arms coupled to one or more corresponding rotors, and/or a change in the angular velocities of one or more rotors, of a UAV. For example, the system 700 may be onboard a UAV as described herein. The system 700 can include a controller 702 in electrical communication with a sensor system 704, a memory 706 and an actuation unit 708. The controller 702 can be configured to receive information from the sensor system 704. For example, the sensor system 704 may be configured to provide information as described herein, such as information used by the controller 702 for determining the change in configuration of one or more arms, and/or the change in the angular velocity of one or more rotors. In some embodiments, the sensor system 704 may comprise one or more sensors configured to provide information relating to a configuration state, orientation and/or position of one or more components of the UAV, such as a payload, and/or an orientation and/or position of the UAV. In some embodiments, the sensor system 704 may comprise a gyroscope, inertial measurement unit (IMU), accelerometer, and mass sensor, GPS sensor, combinations thereof, and/or the like. In some embodiments, the controller 702 may retrieve one or more predetermined values from the memory 706 for one or more calculation processes. In some embodiments, one or more predetermined values stored in the memory 706 may correspond to values indicating the desired change in the one or more arms and/or rotors. The memory 706 is shown as being distinct from the controller 702. In some embodiments, the memory 706 may be a part of the controller. The memory 706 can be removable from the system 700. One or more processors for performing various calculations using the information from the sensor system 704 may be a part of the controller 702. Based on calculations performed by the controller 702 and/or values retrieved from the memory 706, the controller 702 may generate one or more control signals for communicating to the actuation unit 708. The actuation unit 708 may be configured to receive the one or more control signals, and effect the change to the angular velocity of one or more rotors of the UAV and/or the change to the configuration of one or more arms of the UAV based on the one or more control signals. For example, the actuation unit 708 may be configured to effect a change in the length of the one or arms.

Figure 8:
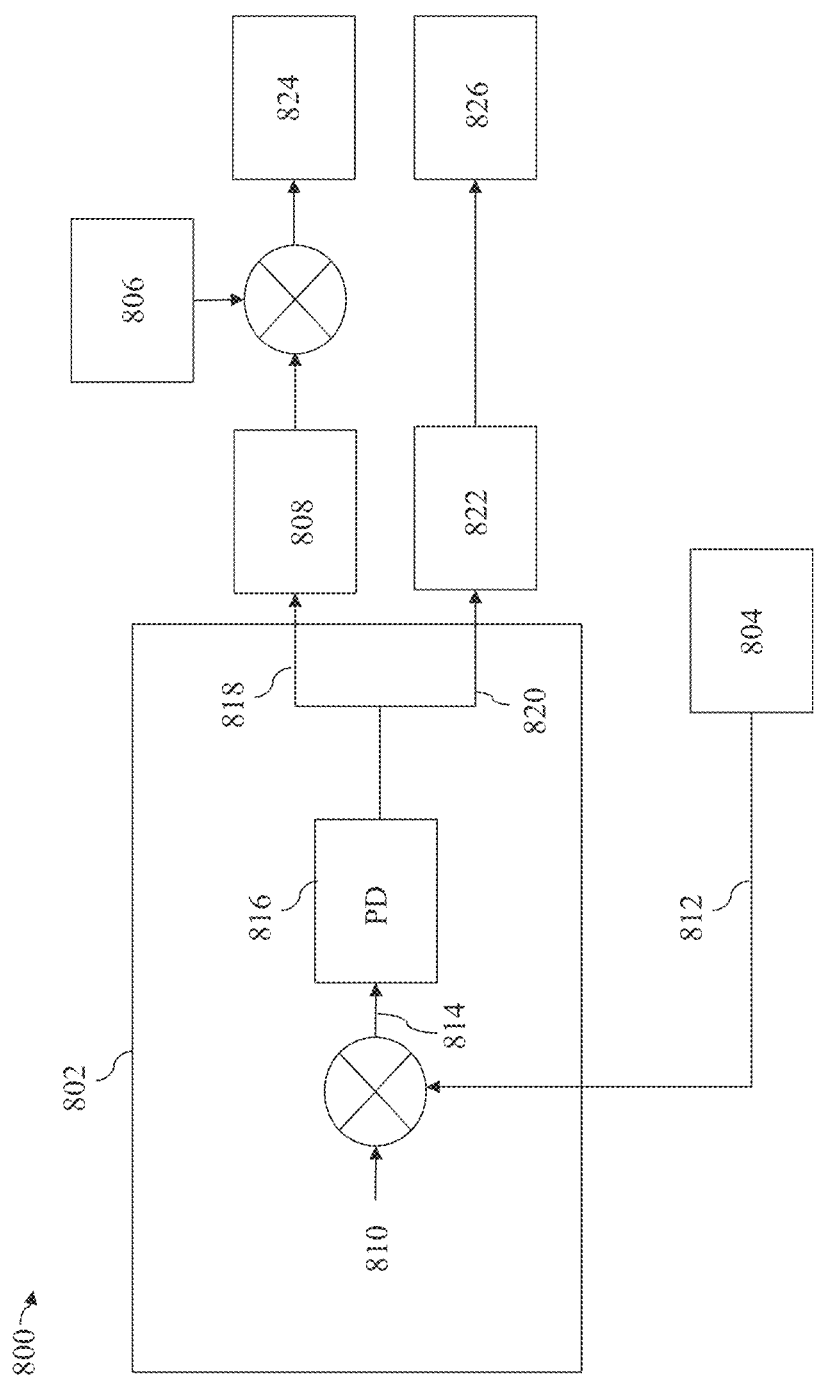
FIG. 8 is a block diagram of a feedback loop for controlling operation of a UAV, according to some embodiments.

In some embodiments, one or more processes for controlling the operation of a UAV can include use of a feedback control loop. In some embodiments, a feedback control loop can be used to adjust the length of one or more arms of the UAV and/or the angular velocity of one or more rotors of the UAV so as to adjust the center of thrust of the UAV. FIG. 8 is a block diagram of an example of a feedback control loop 800 for controlling a UAV. The feedback control loop 800 may be used to adjust the length of one or more arms and the angular velocity of one or more rotors of the UAV to control the center of thrust of the UAV such that the UAV may maintain a desired orientation in response to shifts in the center of gravity of the UAV. For example, the feedback control loop 800 can be used to adjust the angular velocity of one or more rotors and/or the length of one or more arms based on measurements from one or more sensors on the UAV configured to provide information relating to the orientation of the UAV. Based on orientation information of the UAV provided by one or more sensors on the UAV, the feedback control loop 800 can determine adjustments in the length of one or more arms and/or angular velocity of one or more rotors to maintain the orientation of the UAV within desired set-point values. For example, the feedback control loop 800 can be configured to compare rotation of the UAV around one or more of the x-, y-, and z-axes, or the roll, pitch, and yaw angles, respectively, with corresponding roll angle, pitch angle, and yaw angle set point values. Based on comparison of the roll angle, pitch angle, and/or yaw angle with one or more corresponding predetermined set point angle values, one or more processors of the feedback control loop 800 can determine an output torque to be applied to a rotor and/or force to be applied to a linear actuator for extending or retracting an arm, so as to achieve the UAV orientation and center of thrust. The feedback control loop can be implemented using one or more of a proportional (P) controller, a proportional-derivative (PD) controller, a proportional-integral (PI) controller, a proportional-integral-derivative (PID) controller, or combinations thereof.

The feedback loop 800 can include a processor 802 (e.g., a digital signal processor (DSP)), a UAV orientation sensor 804, a linear actuator 822, and a rotor 808. The processor 802 can be located, for example on the central body of the UAV. The UAV orientation sensor 804 can be any sensor suitable for obtaining data indicative of the orientation of the UAV. In some embodiments, the orientation sensor 804 can comprise one or more of an accelerometer, a gyroscope, and/or an IMU. The UAV orientation sensor 804 may be configured to provide information relating to the rotation of the UAV around one or more of the x-, y-, and z-axes. A plurality of sensors can be used, with each sensor providing measurements along a different axis of motion.

The processor 802 can receive input angle set point value 810. The input angle set point value 810 can include a set point angle value for the rotation of the UAV around one or more of the x-, y- and z-axes. The processor 802 can also receive from the UAV orientation sensor 804 a current angle value 812 indicating a current or instantaneous angle at which the UAV is rotated around one or more of the x-, y- and z-axes. The processor 802 can calculate the difference between the input angle set point value 810 and the current angle value 812, also referred to as the "error" in the rotational angle 814. The error in the rotational angle 814 can be input into a PD controller 816. The PD controller 816 can be implemented according to methods known to those of skill in the art. The PD controller 816 can output a rotor output 818 and/or a linear actuator output 820. The rotor output 818 can be provided to a rotor 808 and the linear actuator output 820 can be provided to a linear actuator 822. The rotor output 818 can be configured such that a torque is generated at the rotor 808 to rotate a set of corresponding rotor blades 824 at a desired angular velocity. The linear actuator output 820 can be configured such that the linear actuator 822 provides sufficient linear force upon an arm 826 of the UAV to achieve desired extension or retraction of the arm 826. The rotation of the rotor blades 824 and the extension of the arm 826 are selected so as to provide the desired center of thrust for the UAV, thereby achieve the desired UAV orientation.

In some embodiments, an external disturbance to the rotor 808 and/or one or more components coupled to the rotor (e.g., a set of rotor blades) may result in a disturbance torque 806 being applied to the rotor 808, such that the actual amount of torque applied to the rotor 808 may be the sum of the output torque applied by the rotor 808 and the disturbance torque 806. Thus, it can be seen that the additional disturbance torque 806 may cause the angular velocity that is actually achieved by the rotor blades 824 to be different from the angular velocity that would otherwise be achieved by applying the rotor output 818. These discrepancies may be detrimental to accurate control of the UAV orientation. In some embodiments, the feedback control loop 800 can include an estimate for the disturbance torque 806 such that the torque applied to the rotor 808 can be adjusted to account for the disturbance torque 806.

Figure 9:
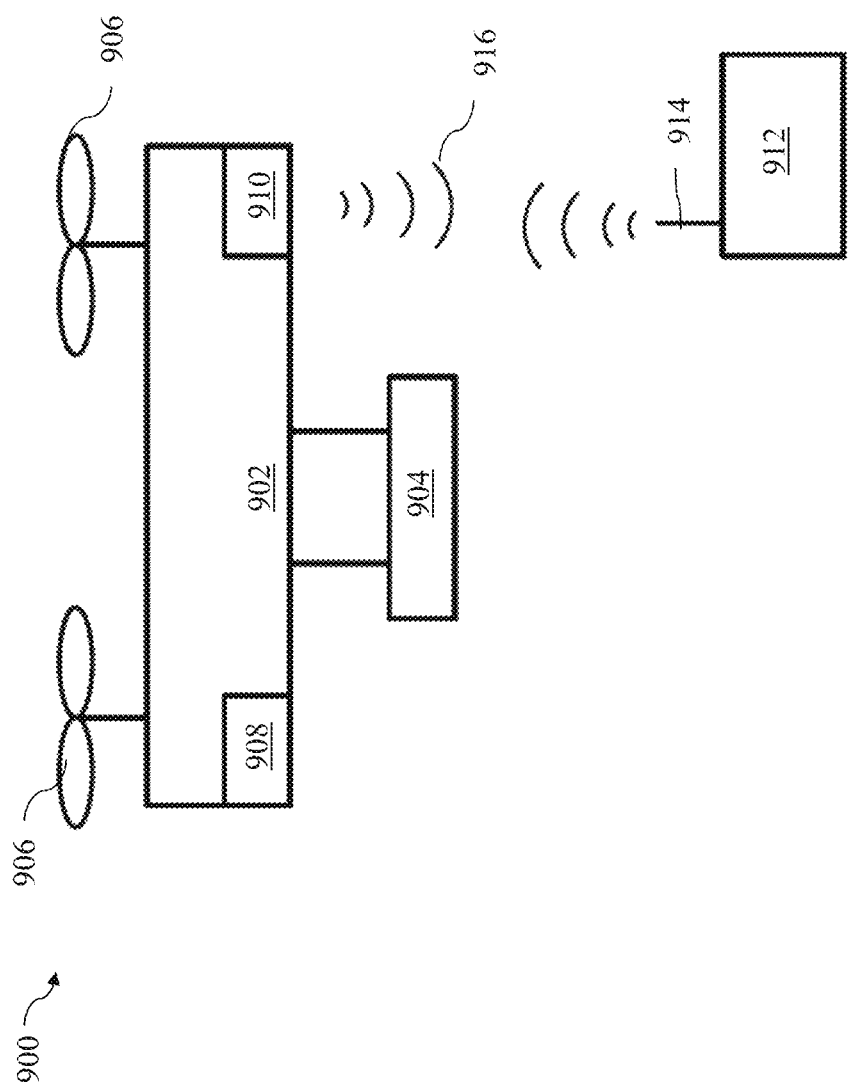
FIG. 9 is a schematic diagram of an example of a movable object including a carrier and a payload.

FIG. 9 illustrates a movable object 900 including a carrier 902 and a payload 904, in accordance with embodiments. Although the movable object 900 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., a UAV), including a UAV as described herein. In some instances, the payload 904 may be provided on the movable object 900 without requiring the carrier 902. The movable object 900 may include propulsion mechanisms 906, a sensing system 908, and a communication system 910.

The propulsion mechanisms 906 can include one or more of rotors, propellers, blades, engines, motors, wheels, axles, magnets, or nozzles, as previously described. For example, the propulsion mechanisms 906 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 906 can be mounted on the movable object 900 using any suitable means, such as a support element (e.g., a drive shaft) as described elsewhere herein. The propulsion mechanisms 906 can be mounted on any suitable portion of the movable object 900, such on the top, bottom, front, back, sides, or suitable combinations thereof.

In some embodiments, the propulsion mechanisms 906 can enable the movable object 900 to take off vertically from a surface or land vertically on a surface without requiring any horizontal movement of the movable object 900 (e.g., without traveling down a runway). Optionally, the propulsion mechanisms 906 can be operable to permit the movable object 900 to hover in the air at a specified position and/or orientation. One or more of the propulsion mechanism 900 may be controlled independently of the other propulsion mechanisms. Alternatively, the propulsion mechanisms 900 can be configured to be controlled simultaneously. For example, the movable object 900 can have multiple horizontally oriented rotors that can provide lift and/or thrust to the movable object. The multiple horizontally oriented rotors can be actuated to provide vertical takeoff, vertical landing, and hovering capabilities to the movable object 900. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 900 (e.g., with respect to up to three degrees of translation and up to three degrees of rotation).

The sensing system 908 can include one or more sensors that may sense the spatial disposition, velocity, and/or acceleration of the movable object 900 (e.g., with respect to up to three degrees of translation and up to three degrees of rotation). The one or more sensors can include any of the sensors previously described herein, including GPS sensors, motion sensors, inertial sensors, proximity sensors, or image sensors. The sensing data provided by the sensing system 908 can be used to control the spatial disposition, velocity, and/or orientation of the movable object 900 (e.g., using a suitable processing unit and/or control module, as described below). Alternatively, the sensing system 908 can be used to provide data regarding the environment surrounding the movable object, such as weather conditions, proximity to potential obstacles, location of geographical features, location of manmade structures, and the like.

The communication system 910 enables communication with terminal 912 having a communication system 914 via wireless signals 916. The communication systems 910, 914 may include any number of transmitters, receivers, and/or transceivers suitable for wireless communication. The communication may be one-way communication, such that data can be transmitted in only one direction. For example, one-way communication may involve only the movable object 900 transmitting data to the terminal 912, or vice-versa. The data may be transmitted from one or more transmitters of the communication system 910 to one or more receivers of the communication system 912, or vice-versa. Alternatively, the communication may be two-way communication, such that data can be transmitted in both directions between the movable object 900 and the terminal 912. The two-way communication can involve transmitting data from one or more transmitters of the communication system 910 to one or more receivers of the communication system 914, and vice-versa.

In some embodiments, the terminal 912 can provide control data to one or more of the movable object 900, carrier 902, and payload 904 and receive information from one or more of the movable object 900, carrier 902, and payload 904 (e.g., position and/or motion information of the movable object, carrier or payload; data sensed by the payload such as image data captured by a payload camera).

In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 906), or a movement of the payload with respect to the movable object (e.g., via control of the carrier 902). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 908 or of the payload 904). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 912 can be configured to control a state of one or more of the movable object 900, carrier 902, or payload 904. Alternatively or in combination, the carrier 902 and payload 904 can also each include a communication module configured to communicate with terminal 912, such that the terminal can communicate with and control each of the movable object 900, carrier 902, and payload 904 independently.

In some embodiments, the movable object 900 can be configured to communicate with another remote device in addition to the terminal 912, or instead of the terminal 912. The terminal 912 may also be configured to communicate with another remote device as well as the movable object 900. For example, the movable object 900 and/or terminal 912 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 900, receive data from the movable object 900, transmit data to the terminal 912, and/or receive data from the terminal 912. Optionally, the remote device can be connected to the Internet or other telecommunications network, such that data received from the movable object 900 and/or terminal 912 can be uploaded to a website or server.

Figure 10:
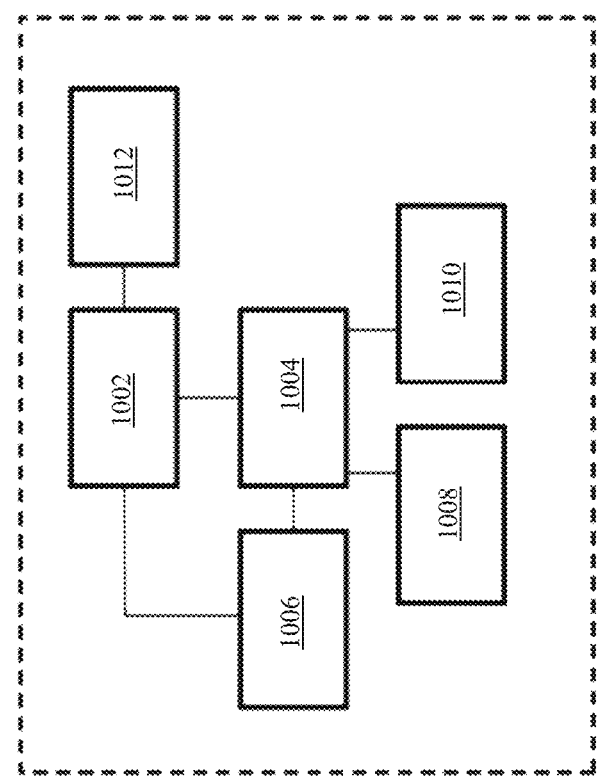
FIG. 10 is a schematic diagram of an example of a system for controlling a movable object.

FIG. 10 is a schematic illustration by way of block diagram of a system 1000 for controlling a movable object, in accordance with embodiments. A movable object may include a UAV as described herein. The system 1000 can be used in combination with any suitable embodiment of the systems, devices, and methods disclosed herein. The system 1000 can include a sensing module 1002, processing unit 1004, non-transitory computer readable medium 1006, control module 1008, and communication module 1010.

The sensing module 1002 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1002 can be operatively coupled to a processing unit 1004 having a plurality of processors. In some embodiments, the sensing module can be operatively coupled to a transmission module 1012 (e.g., a Wi-Fi image transmission module) configured to directly transmit sensing data to a suitable external device or system. For example, the transmission module 1012 can be used to transmit images captured by a camera of the sensing module 1002 to a remote terminal.

The processing unit 1004 can have one or more processors, such as a programmable processor (e.g., a central processing unit (CPU)). The processing unit 1004 can be operatively coupled to a non-transitory computer readable medium 1006. The non-transitory computer readable medium 1006 can store logic, code, and/or program instructions executable by the processing unit 1004 for performing one or more steps. The non-transitory computer readable medium can include one or more memory units (e.g., removable media or external storage such as an SD card or random access memory (RAM)). In some embodiments, data from the sensing module 1002 can be directly conveyed to and stored within the memory units of the non-transitory computer readable medium 1006. The memory units of the non-transitory computer readable medium 1006 can store logic, code and/or program instructions executable by the processing unit 1004 to perform any suitable embodiment of the methods described herein. For example, the processing unit 1004 can be configured to execute instructions causing one or more processors of the processing unit 1004 to analyze sensing data produced by the sensing module. The memory units can store sensing data from the sensing module to be processed by the processing unit 1004. In some embodiments, the memory units of the non-transitory computer readable medium 1006 can be used to store the processing results produced by the processing unit 1004.

In some embodiments, the processing unit 1004 can be operatively coupled to a control module 1008 configured to control a state of the movable object. For example, the control module 1008 can be configured to control the propulsion mechanisms of the movable object to adjust the spatial disposition, velocity, and/or acceleration of the movable object with respect to six degrees of freedom. Alternatively or in combination, the control module 1008 can control one or more of a state of a carrier, payload, or sensing module.

The processing unit 1004 can be operatively coupled to a communication module 1010 configured to transmit and/or receive data from one or more external devices (e.g., a terminal, display device, or other remote controller). Any suitable means of communication can be used, such as wired communication or wireless communication. For example, the communication module 1010 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1010 can transmit and/or receive one or more of sensing data from the sensing module 1002, processing results produced by the processing unit 1004, predetermined control data, user commands from a terminal or remote controller, and the like.

The components of the system 1000 can be arranged in any suitable configuration. For example, one or more of the components of the system 1000 can be located on the movable object, carrier, payload, terminal, sensing system, or an additional external device in communication with one or more of the above. Additionally, although FIG. 10 depicts a single processing unit 1004 and a single non-transitory computer readable medium 1006, one of skill in the art would appreciate that this is not intended to be limiting, and that the system 1000 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1000 can occur at one or more of the aforementioned locations.

The systems, devices, and methods described herein can be applied to a wide variety of movable objects. As previously mentioned, any description herein of an aerial vehicle may apply to and be used for any movable object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

As used herein A and/or B encompasses one or more of A or B, and combinations thereof such as A and B.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A method of controlling an unmanned aerial vehicle, comprising:
   receiving a first signal comprising information relating to a payload of the unmanned aerial vehicle, the information including at least one of a payload type or a payload configuration state of the payload, wherein the unmanned aerial vehicle comprises:
   a plurality of arms, at least one of the plurality of arms extending from a central body; and
   a plurality of propulsion units, at least one of the plurality of propulsion units being positioned on a corresponding arm of the plurality of arms at a distance from a reference point on the central body;
   accessing a table stored in a memory of the unmanned aerial vehicle using the information including the at least one of the payload type or the payload configuration state to obtain a predetermined value indicating a change in length of one or more of the plurality of arms, the change in length of the one or more of the plurality of arms corresponding to the at least one of the payload type or the payload configuration state; and
   generating a second signal for changing a configuration of the one or more of the plurality of arms based on the predetermined value to change the distance of the at least one of the plurality of propulsion units from the reference point.

2. The method of claim 1, wherein receiving the first signal comprises receiving information indicating the payload type of the payload.

3. The method of claim 1, wherein receiving the first signal comprises receiving information of the payload configuration state of the payload.

4. The method of claim 1, wherein receiving the first signal comprises receiving the first signal from at least one sensor on the unmanned aerial vehicle.

5. The method of claim 1, further comprising:
   performing a calculation using the predetermined value;
   wherein generating the second signal for changing the configuration of the one or more of the plurality of arms based on the predetermined value comprises generating a signal based on a result of the calculation.

6. The method of claim 1, wherein generating the second signal for changing the configuration of the one or more of the plurality of arms based on the predetermined value comprises generating a signal comprising an instruction to change a length of the one or more of the plurality of arms.

7. The method of claim 1, wherein:
   the information is measured by one or more sensors of the unmanned aerial vehicle and/or derived from values measured by the one or more sensors and indicates:
   the payload configuration state prior to and after a configuration change; or
   that a telescope feature of the payload will be, is being, or has been extended or retracted.

8. A unmanned aerial vehicle comprising:
   a central body;
   a plurality of arms, at least one of the plurality of arms extending outwardly from the central body; and
   a plurality of propulsion units coupled to corresponding arms of the plurality of arms, a distance of at least one of the plurality of propulsion units from a reference point on the central body being adjustable by manipulating a configuration of at least one of the corresponding arms in response to a change in a center of gravity of the unmanned aerial vehicle, including, in response to the center of gravity being outside a thrust shifting zone that is a largest area enclosed by lines connecting rotational axes of rotors of the plurality of propulsion units:
   extending one or more of the plurality of arms to expand the thrust shifting zone to cause the center of gravity to be within the thrust shifting zone;
   calculating values of angular velocities of rotors of the plurality of propulsion units;
   comparing the calculated values with a threshold; and
   controlling the rotors according to the comparison, including:
   in response to one of the calculated values being greater than the threshold:
   setting an angular velocity of a corresponding rotor corresponding to the one of the calculated values to the threshold; and
   adjusting an arm length of one of the arms corresponding to the corresponding rotor; or
   in response to the calculated values being smaller than or equal to the threshold, setting the angular velocities of the rotors to the calculated values without adjusting an arm length of any of the arms.

9. The unmanned aerial vehicle of claim 8, wherein the distance of the at least one of the plurality of propulsion units from the reference point comprises a distance from a rotational axis of the rotor of the at least one of the plurality of propulsion units to the reference point.

10. The unmanned aerial vehicle of claim 8, further comprising:
a plurality of sets of rotor blades;
wherein:
each set of the plurality of sets of rotor blades is coupled to a corresponding one of the plurality of rotors; and
an angular velocity of at least one set of the plurality of sets of rotor blades is adjustable in response to the change in the center of gravity of the unmanned aerial vehicle.

11. The unmanned aerial vehicle of claim 8, further comprising:
a payload;
wherein the change in the center of gravity of the unmanned aerial vehicle comprises a change in a configuration of the payload.

12. The unmanned aerial vehicle of claim 11, wherein the payload comprises a telescoping feature.

13. The unmanned aerial vehicle of claim 8, further comprising:
one or more sensors; and
one or more processors configured to receive a first signal comprising information relating to a payload of the unmanned aerial vehicle;
wherein the information is measured by the one or more sensors and/or derived from values measured by the one or more sensors, the information including at least one of a payload type or a payload configuration state of the payload, and indicating:
the payload configuration state prior to and after a configuration change; or
that a telescope feature of the payload that will be, is being, or has been extended or retracted.

14. A method of operating an unmanned aerial vehicle, comprising:
receiving a first signal indicating a change in a center of gravity of the unmanned aerial vehicle, wherein the unmanned aerial vehicle comprises:
a central body;
a plurality of arms, at least one of the plurality of arms extending outwardly from the central body; and
a plurality of propulsion units, the plurality of propulsion units being coupled to corresponding arms of the plurality of arms; and
adjusting a distance of at least one of the plurality of propulsion units from the central body by manipulating a configuration of at least one of the corresponding arms in response to the change in the center of gravity of the unmanned aerial vehicle, including, in response to the center of gravity being outside a thrust shifting zone that is a largest area enclosed by lines connecting rotational axes of rotors of the plurality of propulsion units:
extending one or more of the plurality of arms to expand the thrust shifting zone to cause the center of gravity to be within the thrust shifting zone;
calculating values of angular velocities of rotors of the plurality of propulsion units;
comparing the calculated values with a threshold; and
controlling the rotors according to the comparison, including:
in response to one of the calculated values being greater than the threshold:
setting an angular velocity of a corresponding rotor corresponding to the one of the calculated values to the threshold; and
adjusting an arm length of one of the arms corresponding to the corresponding rotor; or
in response to the calculated values being smaller than or equal to the threshold, setting the angular velocities of the rotors to the calculated values without adjusting an arm length of any of the arms.

15. The method of claim 14, wherein:
adjusting the distance comprises adjusting a distance from a rotational axis of the rotor of the at least one of the plurality of propulsion units to the central body.

16. The method of claim 14,
wherein:
the unmanned aerial vehicle further comprises a plurality of sets of rotor blades; and
each set of the plurality of sets of rotor blades is coupled to a corresponding one of the plurality of rotors;
the method further comprising adjusting an angular velocity of at least one set of the plurality of sets of rotor blades in response to the change in the center of gravity of the unmanned aerial vehicle.

17. The method of claim 14, wherein:
the unmanned aerial vehicle further comprises a payload; and
manipulating the configuration of the at least one of the corresponding arms in response to the change in the center of gravity of the unmanned aerial vehicle comprises manipulating the configuration of the at least one of the corresponding arms in response to a change in a configuration of the payload.

18. The method of claim 14, wherein:
the first signal includes information relating to a payload of the unmanned aerial vehicle, the information being measured by one or more sensors of the unmanned aerial vehicle and/or derived from values measured by the one or more sensors, the information including at least one of a payload type or a payload configuration state of the payload, and indicating:
the payload configuration state prior to and after a configuration change; or
that a telescope feature of the payload that will be, is being, or has been extended or retracted.

* * * * *